(12) United States Patent
Borst et al.

(10) Patent No.: US 8,128,500 B1
(45) Date of Patent: Mar. 6, 2012

(54) SYSTEM AND METHOD FOR GENERATING A VIRTUAL ENVIRONMENT FOR LAND-BASED AND UNDERWATER VIRTUAL CHARACTERS

(75) Inventors: Karl Joseph Borst, Toronto (CA); Stephen Braund, Maple (CA)

(73) Assignee: Ganz, Woodbridge, Ontario ( * ) Notice: Subject to any disclaimer, the term of this patent is extended or adjusted under 35 U.S.C. 154(b) by 826 days.

(21) Appl. No.: 12/172,625

(22) Filed: Jul. 14, 2008

Related U.S. Application Data

(60) Provisional application No. 60/949,764, filed on Jul. 13, 2007.

(51) Int. Cl.
*A63F 9/24* (2006.01)
*A63F 13/00* (2006.01)
*G06F 17/00* (2006.01)
*G06F 19/00* (2011.01)

(52) U.S. Cl. .............. 463/40; 463/42; 700/19; 446/268; 446/431

(58) Field of Classification Search ......................... None
See application file for complete search history.

(56) References Cited

U.S. PATENT DOCUMENTS

| | | | |
|---|---|---|---|
| 5,411,259 A | 5/1995 | Pearson | |
| 5,880,731 A | 3/1999 | Liles et al. | |
| 5,890,963 A | 4/1999 | Yen | |
| 5,966,526 A | 10/1999 | Yokoi | |
| 6,009,458 A | 12/1999 | Hawkins et al. | |
| 6,031,549 A | 2/2000 | Hayes-Roth | |
| 6,175,857 B1 | 1/2001 | Hachiya et al. | |
| 6,219,045 B1 | 4/2001 | Leahy et al. | |
| 6,227,966 B1 | 5/2001 | Yokoi | |
| 6,267,672 B1 | 7/2001 | Vance | |
| 6,273,815 B1 | 8/2001 | Stuckman et al. | |
| 6,290,565 B1 | 9/2001 | Galyean, III et al. | |
| 6,311,195 B1 | 10/2001 | Hachiya et al. | |

(Continued)

FOREIGN PATENT DOCUMENTS

EP 1382372 A1 1/2004

(Continued)

OTHER PUBLICATIONS

Earthworm Jim for SNES—Gamespot—Oct. 1994—URL <http://www.gamespot.com/snes/action/earthwormjim/similar.html?mode=versions> —accessed on Apr. 18, 2011.*

(Continued)

*Primary Examiner* — Paul A. D'Agostino
(74) *Attorney, Agent, or Firm* — Pearne & Gordon LLP

(57) ABSTRACT

A method provides a virtual presentation including a virtual character in an environment other than a natural environment of the virtual character. The method includes validating a registration code associated with a toy, providing at least one virtual room representing a natural environment of the toy in the virtual presentation, and displaying the virtual character in the virtual room representing the natural environment of the toy, which represents the toy in the virtual presentation. The method further includes providing at least one additional virtual room representing an unnatural environment of the toy in the virtual presentation, the unnatural environment of the toy being different than the natural environment of the toy, and providing the virtual character with an environment extension tool that enables the virtual character to exist in the room representing the unnatural environment of the toy. The virtual character and the environment extension tool can be displayed in the unnatural environment of the toy.

15 Claims, 20 Drawing Sheets

U.S. PATENT DOCUMENTS

| | | |
|---|---|---|
| 6,404,438 B1 | 6/2002 | Hatlelid |
| 6,406,370 B1 | 6/2002 | Kumagai |
| 6,476,830 B1 | 11/2002 | Farmer et al. |
| 6,522,333 B1 | 2/2003 | Hatlelid |
| 6,539,400 B1 | 3/2003 | Bloomfield et al. |
| 6,554,679 B1 | 4/2003 | Shackelford et al. |
| 6,560,511 B1 | 5/2003 | Yokoo et al. |
| 6,595,858 B1 | 7/2003 | Tajiri et al. |
| 6,609,968 B1 | 8/2003 | Okada et al. |
| 6,616,532 B2 | 9/2003 | Albrecht |
| 6,704,784 B2 | 3/2004 | Matsuda et al. |
| 6,722,973 B2 | 4/2004 | Akaishi |
| 6,729,884 B1 | 5/2004 | Kelton et al. |
| 6,745,236 B1 | 6/2004 | Hawkins et al. |
| 6,758,746 B1 | 7/2004 | Hunter |
| 6,773,325 B1 | 8/2004 | Mawle et al. |
| 6,910,186 B2 | 6/2005 | Kim |
| 6,918,833 B2 | 7/2005 | Emmerson et al. |
| 6,959,166 B1 | 10/2005 | Gabai et al. |
| 7,061,493 B1 | 6/2006 | Cook et al. |
| 7,089,083 B2 | 8/2006 | Yokoo et al. |
| 7,155,680 B2 | 12/2006 | Akazawa et al. |
| 7,171,154 B2 | 1/2007 | Fujisawa |
| 7,179,171 B2 | 2/2007 | Forlines et al. |
| 7,181,690 B1 | 2/2007 | Leahy et al. |
| 7,191,220 B2 | 3/2007 | Ohwa |
| 7,208,669 B2 | 4/2007 | Wells et al. |
| 7,229,288 B2 | 6/2007 | Stuart et al. |
| 7,249,139 B2 | 7/2007 | Chuah et al. |
| 7,314,407 B1 | 1/2008 | Pearson |
| 7,396,281 B2* | 7/2008 | Mendelsohn et al. ......... 463/42 |
| 7,478,047 B2 | 1/2009 | Loyall et al. |
| 7,645,178 B1* | 1/2010 | Trotto et al. ................. 446/268 |
| 7,843,471 B2* | 11/2010 | Doan et al. .................... 345/633 |
| 2002/0002514 A1* | 1/2002 | Kamachi et al. ............... 705/27 |
| 2002/0082077 A1 | 6/2002 | Johnson et al. |
| 2002/0094851 A1 | 7/2002 | Rheey |
| 2002/0113809 A1 | 8/2002 | Akazawa et al. |
| 2002/0119810 A1 | 8/2002 | Takatsuka et al. |
| 2002/0130894 A1 | 9/2002 | Young et al. |
| 2004/0043806 A1 | 3/2004 | Kirby et al. |
| 2004/0053690 A1 | 3/2004 | Fogel et al. |
| 2004/0093266 A1 | 5/2004 | Dohring |
| 2004/0143852 A1 | 7/2004 | Meyers |
| 2004/0219961 A1 | 11/2004 | Ellenby et al. |
| 2004/0242326 A1* | 12/2004 | Fujisawa et al. ................ 463/42 |
| 2005/0049725 A1* | 3/2005 | Huang ............................ 700/19 |
| 2005/0059483 A1 | 3/2005 | Borge |
| 2005/0137015 A1 | 6/2005 | Rogers et al. |
| 2005/0177428 A1 | 8/2005 | Ganz |
| 2005/0182693 A1 | 8/2005 | Alivandi |
| 2005/0250415 A1 | 11/2005 | Barthold |
| 2005/0250416 A1 | 11/2005 | Barthold |
| 2006/0079150 A1* | 4/2006 | Filoseta et al. ................. 446/431 |
| 2006/0100018 A1* | 5/2006 | Ganz ............................... 463/42 |
| 2006/0181535 A1* | 8/2006 | Watt .............................. 345/473 |
| 2007/0050716 A1 | 3/2007 | Leahy et al. |
| 2007/0099685 A1 | 5/2007 | Van Luchene |
| 2007/0130001 A1 | 6/2007 | Jung et al. |
| 2007/0143679 A1 | 6/2007 | Resner |
| 2007/0197297 A1* | 8/2007 | Witchey ......................... 463/42 |
| 2007/0211047 A1* | 9/2007 | Doan et al. .................... 345/419 |
| 2008/0163055 A1 | 7/2008 | Ganz |

FOREIGN PATENT DOCUMENTS

| | | |
|---|---|---|
| WO | 01/69829 A2 | 9/2001 |
| WO | 0190841 A1 | 11/2001 |
| WO | 0222224 A1 | 3/2002 |

OTHER PUBLICATIONS

Worst Water Levels—Earthworm Jim—GamesRadar -Oct. 1994—URL <http://www.gamesradar.com/f/the-absolute-worst-water-levels/a-2009100711214920020>—accessed on Apr. 18, 2011.*

Chicken Little: Fish out of Water's Fish n' Ship—Online Game—2006—URL <http://www.dan-dare.org/FreeFun/Games/CartoonsMoviesTV/ChickenLittle/ChickenLittle2.htm>—accessed on Apr. 18, 2011.*

Don Burleson Blog, "Scuba Diving Horses & Dogs & Cats", 2 pg, Sep. 9, 2005.*

Multiply website, Futurama Fish Thingy, 2 pg, Oct. 2006.*

Multiply website Futurama Fish Thingy, 1 pg, Oct. 2006.*

IGN website Futurama DVD Review, 5 pp, Mar. 2003.*

Amazon.com website DVD information of Futurama vol. One, dated Mar. 13, 2003, source: archive.org. 2003.*

Gizmo Watch Terranaut, 1 pg, Sep. 17, 2006.*

Amazon.com "Watchmen Book", 1 pg, Nov. 24, 2006. Source: archive.com.*

Watchmen Absolute edition image, 1 pg, Nov. 2006.*

Watchmen Absolute edition image—close up of exile to Mars, 1 pg, Nov. 2006.*

"The Sims Booklet," dated 2000.

Grace, "Web Site Tycoon's Next Goal: Sixth Grade"; Woonsocket Call, Jun. 19, 2002.

http://web.archive.org.web.20031202190119/www.monopets.com/, Dec. 2, 2003.

de Sevin, Etienne; et al, "An Affective Model of Action Selection for Virtual Humans," Swiss Federal Institute of Technology; 2005.

Matsuda, Kouichi. "Evaluation of Personal Agent-Oriented Virtual Society-PAW." Presence 10, 2; 2001: 160-174.

* cited by examiner

SYSTEM AND METHOD FOR GENERATING A VIRTUAL ENVIRONMENT FOR LAND-BASED AND UNDERWATER VIRTUAL CHARACTERS

CROSS-REFERENCES TO RELATED APPLICATIONS

This application claims the benefit of U.S. Provisional Application Ser. No. 60/949,764 filed on Jul. 13, 2007, which is incorporated herein by reference in its entirety.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by the law, but otherwise reserves all copyright rights whatsoever.

FIELD OF THE INVENTION

This application relates generally to a system and method for toy adoption and marketing.

More specifically, this application relates to an Entertainment System including a virtual environment in combination with a commercially purchased toy, wherein the system allows a toy user to register the toy within the virtual environment using a registration code and presents a virtual character that represents the toy in the virtual world. With the virtual character, also referred to herein as a virtual representation, the user access to various activities and scenarios in the virtual world via a computer connected to the Internet. The user can also control the virtual character to interact with other virtual characters owned by the user, another user or both the user and the another user in a virtual environment that may not be the natural environment of the virtual character.

BACKGROUND OF THE INVENTION

Typically, a consumer purchases a toy (e.g., a stuffed plush animal or other creature, etc.) as a gift for a child, for example, and that child then uses the toy for imaginative activities. The child may enjoy playing with the toy, but since the toy is static, the child may lose interest in it over time.

Similarly, video games allow children and other users to control a virtual being, and allow the user to maneuver the virtual being through a series of adventures. But video games offer a limited number of environments in which the virtual being can be used. Other virtual beings not found in those environments do not encounter, or interact with the virtual being controlled by the user. Thus, the number of virtual being interactions in such video games is limited.

SUMMARY OF THE INVENTION

Provided is a method for providing a virtual world presentation to a user for entertainment. The method includes providing a virtual presentation including a virtual character in an environment other than a natural environment of the virtual character, and further includes validating a registration code associated with a toy; providing at least one virtual room representing a natural environment of the toy in the virtual presentation; and displaying the virtual character in the virtual room representing the natural environment of the toy, wherein the virtual character represents the toy in the virtual presentation. The method further includes providing at least one additional virtual room representing an unnatural environment of the toy in the virtual presentation, wherein the unnatural environment of the toy is different than the natural environment of the toy; providing the virtual character with an environment extension tool that enables the virtual character to exist in the room representing the unnatural environment of the toy; and displaying the virtual character and the environment extension tool in the unnatural environment of the toy.

Also provided is a method of providing a virtual presentation including a virtual character in an environment other than a natural environment of the virtual character. The method comprises validating a registration code associated with a toy representing a living creature; providing at least one virtual room in the virtual presentation representing a natural environment in which the living creature can exist for an extended period of time without a life-sustaining measure; and displaying the virtual character in the virtual room representing the natural environment, wherein the virtual character represents the toy, the living creature, or both the toy and the living creature in the virtual presentation. The method further comprises providing at least one additional virtual room in the virtual presentation representing an unnatural environment in which the living creature can not exist for an extended period of time without the life-sustaining measure; providing the virtual character with the life-sustaining measure that enables the virtual character to exist in the room representing the unnatural environment; and displaying the virtual character and the life sustaining measure in the unnatural environment of the living creature.

The virtual world data of the above method is for use by the user computer to present a virtual world to the user, and the virtual world includes a virtual character representing the toy, and further the virtual world provides both a virtual room representing a natural environment of the virtual character and a virtual room representing an unnatural environment of the virtual character.

Further provided is an entertainment system for allowing interaction between virtual characters in a common environment, comprising a validation component operative to validate a registration code associated with a toy that represents a real-world item, a natural environment component operative to generate at least one virtual room representing a natural environment of the real-world item represented by the toy in the virtual presentation, and a virtual character component operative to generate a virtual character to be displayed in the virtual room representing the natural environment of the real-world item, wherein the virtual character represents the toy in the virtual presentation. The system further comprises an unnatural environment component operative to generate at least one additional virtual room representing an unnatural environment of the real-world item, wherein the unnatural environment is different than the natural environment; a crossover component operative to generate and provide to the virtual character an environment extension tool that enables the virtual character to exist in the room representing the unnatural environment of the real-world item represented by the toy; and a display generating component operative to display the virtual character and the environment extension tool in the unnatural environment.

The virtual world data of this system is for use by the user computer to present a virtual world to the user and provide both a virtual room representing a natural environment of the virtual character and a virtual room representing an unnatural environment of the virtual character.

Still further provided is a computer readable medium for storing computer readable program code for performing the method disclosed herein by utilizing a computer system, as also disclosed herein.

DETAILED DESCRIPTION OF THE PREFERRED EMBODIMENTS

Figure 1:
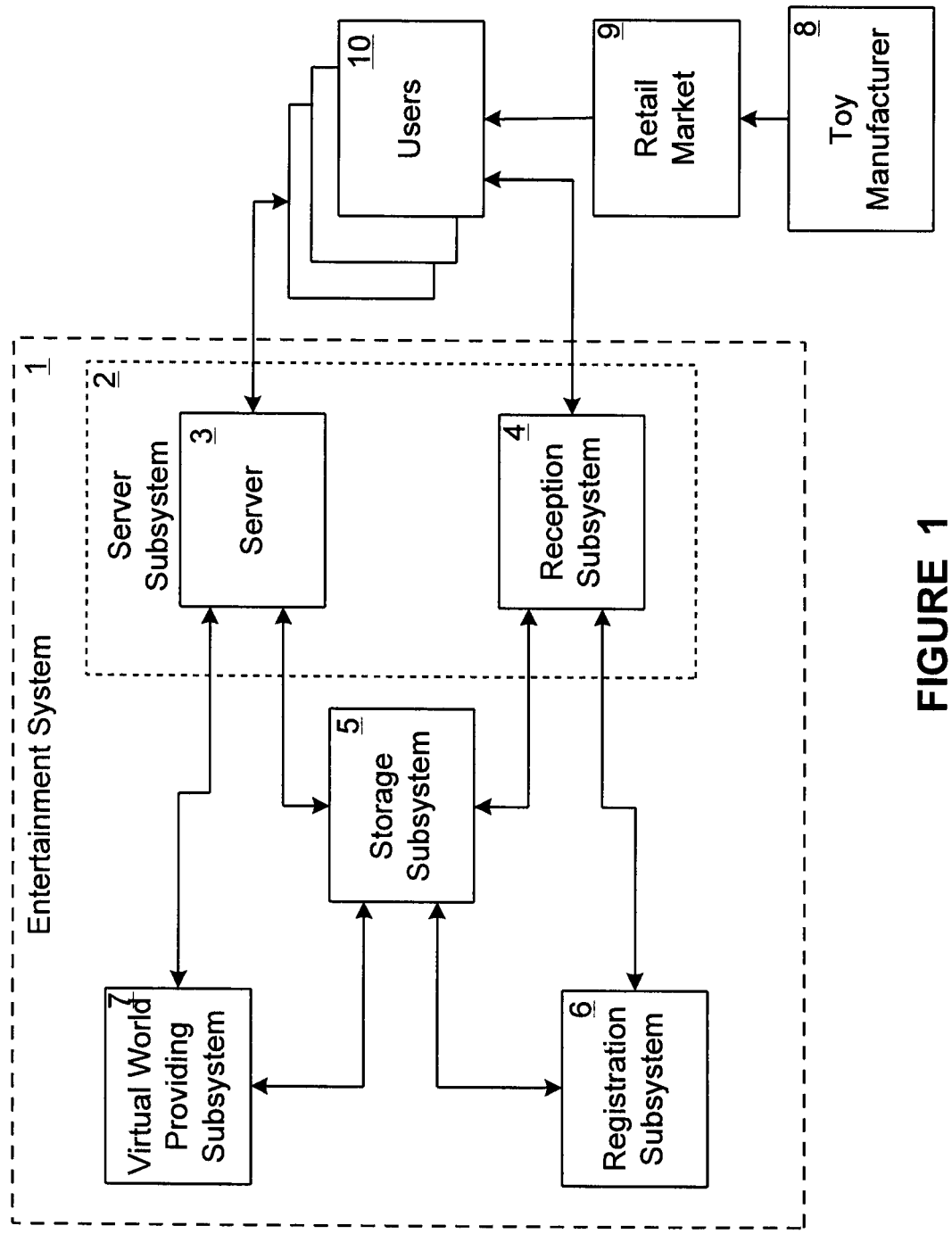
FIG. 1 shows a schematic block diagram of a current embodiment of the system and its interactions with some external entities.

When a toy manufacturer sells a toy to a child, for example, the toy manufacturer's relationship with the toy does not typically continue beyond purchase of the toy. Perhaps another toy might be later purchased, but there is no continuity beyond those purchases. The inventors recognize that this lack of continuity represents a lost opportunity to take advantage of the fact that the child or other toy owner likely wants to create a whole imaginative world for the toy for play purposes. A means of creating such an imaginative world using modern computer tools, such as a personal computer connected to the internet is disclosed herein. The toy can be utilized in a computer generated "virtual world" for various games and activities, given a name and a history, and taken care of. This allows the owner a more varied and interactive means of playing with the toy.

Further, the virtual world can optionally be used to maintain the relationship between the toy owner and the toy manufacturer (or, alternatively a retailer or service provider), allowing new toys, accessories, and services of the manufacturer, retailer, or other provider to be offered to the toy owner, thereby increasing the potential market for the manufacturer and increasing the usage of the toy by the user. Such a virtual world can also optionally provide many educational and gaming scenarios that would engage a child or adult with many hours of play.

The user is likely to collect various different toys having real life counterparts that commonly exist in different natural environments. Isolating virtual representations of toys in a virtual world to separate environments limits the interactions that can take place between those different virtual representations, thereby limiting the enjoyment that can be experienced by the users. Thus, the virtual world includes two or more different environments, and allows at least one virtual representation of a toy that naturally exists in an environment to interact with at least one virtual representation of a toy that naturally exists in another, different environment. The two or more interacting virtual representations can interact in a common environment while the interactions are taking place, and the common environment can be the natural environment of at least one of the interacting virtual representations.

By engaging the toy owner in the virtual world, advertising and other marketing advantages would likely occur because of the additional satisfaction that the toy would provide, hence leading to potential word-of-mouth and other means of marketing the toy and the website.

Accordingly, a system for creating such a virtual world and allowing interaction between virtual representations of toys having real-life counterparts that exist in separate environments to take advantage of such marketing potential is disclosed herein.

Provided is an Entertainment System including an online "virtual world" where the user of a toy can register the toy using a registration number provided with the toy when purchased or otherwise associated with the toy, adopt the toy online, and play with a virtual representation of the toy (the "virtual toy") in the virtual world. In an illustrative embodiment, which may be implemented by computer executable instructions read from a computer-readable medium, the "virtual world" can be implemented using an interactive website via a user computer connected to the Internet. In this manner, a user can play with the virtual toy in a computer generated fantasy world (i.e., the virtual world). Examples of the computer-readable medium suitable for storing the computer executable instructions include a magnetic or solid-state hard disk drive ("HDD") associated with a personal computer, server and the like; an optical storage medium such as a compact disc ("CD"), digital versatile disc ("DVD") and the like; electronically erasable programmable read-only memory ("EEPROM") such as a USB flash drive and the like; and any other medium that can store the computer executable instructions in a format that can be retrieved and parsed by the user computer.

Graphics, animation, sound, and even recorded images might be utilized to generate this virtual world. Even live images might be utilized, if desired. In addition, other sources of material can also be utilized. In essence, the virtual world creates an interactive playland for the toy owner to encourage imagination using the toy, and at the same time, provide an incentive to purchase additional toys or encourage additional individuals to also purchase toys in order to participate in the Entertainment System.

Throughout this disclosure, the term "virtual" is used, for example, to describe the user viewable/hearable material presented to the user on the user computer from data and/or computer programs and commands generated and/or provided by the Entertainment System, to the user computer running one or more computer applications (e.g., a web browser with the appropriate plug-ins, applets, and/or other support programs, etc.). The System can provide the data and/or programs, via a communication network connected to the System and the user computer (e.g., the Internet). According to alternate embodiments the data and/or programs, or at least a portion thereof, can be stored locally by the user computer and parsed or otherwise executed to present the virtual world to the user.

The term "virtual" does not necessarily mean that the displayed item is not "real", because the displayed item could, for example, be a video or picture of a real-world item, for example. Furthermore, the "virtual world" is presented using "real" physical phenomena (e.g., light and sound), and is impacted by "real" user interactions (e.g., mouse and keyboard manipulations). Rather, the term "virtual" is used to describe the computer generated and/or provided presentation to the user, including both visual and audible effects, via the user computer. It is a "virtual world" in the sense that it is primarily a computer presented fantasy world with which the user can interact via manipulations of the user computer. In this manner, the "virtual" items of the virtual world can be presented as interacting with each other and with the user. Furthermore, the user is provided access to games and trivia as well.

Likewise, the phrase "real-world item" refers to an actual item that exists in reality, such as an animal, person, vehicle, toy and any other tangible items that are commonly encountered in reality. However, according to alternate embodiments "real-world items" do not actually exist in reality but can be any animal, person, vehicle, and the like that exists in a fictional environment, such as a dinosaur, a dragon, a character in a story, and the like, that can be represented by a toy. Further, the phrase "real-world items" is not limited to living creatures. Real-world items can also include non-living creatures such as vehicles, dinosaurs and the like. For example, an automobile naturally operates on the ground, which is considered to be the natural environment of the vehicle. Likewise, a boat naturally operates on water, which is considered to be the natural environment of the boat. But the car can not operate on water, and thus, water is considered an unnatural environment of the car, requiring an environment extension tool such as a floatation device to enable the car to operate on water.

But regardless of whether the real-world item exists in reality or is a fictional character, each real-world item has what is referred to herein as a natural environment. The natural environment of the real-world item can be considered the native environment or atmosphere in which the real-world item exists without an "environment extension tool", which includes an external life-support measure for living creatures as described below. For example, considering a fish as the real-world item. The natural environment for the fish is an aqueous environment. In the aqueous environment, the fish can live and breathe without the aid of a separate oxygen supply. Gaseous oxygen is dissolved in the water of the aqueous environment, allowing respiration to occur freely in this environment. On the contrary, humans, birds and other animals breathe gaseous oxygen from the atmosphere of their natural environment for respiration purposes. When in this natural environment, the humans, birds and other animals do not need an external source of oxygen to live.

From the examples above, the "natural environment" of fish and other underwater creatures is the aqueous environment. These creatures utilize oxygen dissolved in water from the aqueous environment for respiration. All other environments, such as the atmospheric environment in which humans, birds and other animals breathe gaseous oxygen for respiration, as well as environments that lack sufficient levels of oxygen for respiration such as outer space beyond the Earth's atmosphere, are considered "unnatural environments" for the fish. Similarly, the "natural environment" of humans, birds and other animals and other land-dwelling and airborne creatures that have gaseous oxygen in the air for respiration is the atmospheric environment. All other environments such as: the aqueous environment in which the fish and other underwater creatures breath oxygen dissolved in a liquid such as water for respiration, as well as environments that lack sufficient levels of oxygen for respiration such as outer space beyond the Earth's atmosphere are considered "unnatural environments" for humans, birds and other animals.

The previous examples focused on living creatures as the real-world items and the environments in which respiration for those creatures naturally occurs as the natural environments. For the living creatures to exist in their unnatural environment where respiration does not naturally occur for extended periods of time, an external life-support measure is required to allow the living creature to remain in its unnatural environment for an extended period of time (i.e., more than the maximum time between breaths for respiration).

In an embodiment, the virtual world provides a biography of the toy, a virtual representation of the toy (the virtual toy) using graphics and/or sound (such as an animated image, for example) to participate in games and activities. The system also provides a virtual means for maintaining the "health and well-being" of the character through various maintenance activities, such as virtual feeding and playing, virtual shopping, and virtual medical checkups, for example.

Furthermore, the Entertainment System can be utilized for marketing additional toys and/or accessories and/or services related to the toy to allow restricted access to additional online activities and features to those who purchase the toys.

The Entertainment System of the current embodiment may provide some general services and features open to the public, such as information about the toys and where to purchase them, a description of the features of the website, and other similar information. However, the primary purpose of the System in the current embodiment is to encourage the public to purchase a toy to obtain a registration code for access to the primary features and services. Accordingly, the primary features of the System are restricted to registered users. The existence of the System may encourage initial sales of the toy by new users (such as via word-of-mouth from current users), and the System will also encourage the purchase of additional toys by current users.

Online sales may be supported and encouraged in an alternate embodiment. In a current embodiment, the invention is intended to be utilized to sell toys in retail establishments. Thus, the invention becomes a marketing tool, utilizing word-of-mouth and the desire to increase participation in the virtual world, and thusly makes the toys more attractive to retail merchants and increases their sales.

In essence, a current embodiment provides an Entertainment System including an online virtual world with a virtual toy representing a toy purchased at a retail store or otherwise acquired new by the user. The toys might be plush toy animals, for example. However, there is no limit to the type of toy that the system could support. The toy can be represented by a virtual replica. According to some embodiments, the toy represents or resembles a real-world item. Thus, the natural and unnatural environments of the real-world item related to the toy are also considered and referred to herein as the natural and unnatural environments of the toy.

The current system functions basically as follows: A consumer purchases a toy (such as the plush toy animal representing a particular animal, for example, or some other toy). The toy includes a tag attached to the toy body or the toy packaging (or alternatively, another indicator and/or a storage device) providing instructions on how to register the toy and gain access to the virtual character that represents the toy. For example, the tag can indicate a web site address and a registration code. The user can load the System web site using the web address in a browser application running on the user's computer, and then enter the registration code to register the toy, thereby obtaining access to restricted portions of the System website.

In an alternative embodiment, the code can be automatically entered via the storage device, for example, for automatically loading, and/or downloading, and/or registering the user with the System.

Registration allows the user to participate in a virtual adoption process utilizing a virtual online replica of the toy (the "virtual toy") to provide an analogous online representation of the toy. The virtual toy can optionally look somewhat like the toy (e.g., same type of toy, similar shapes, color patterns, etc.), but could be more "cartoonized", for example, and can be animated, which may or may not be the case for the real toy.

The registered user can then participate in various activities both for enjoyment, and to virtually "maintain" the virtual toy in a happy, healthy, contented state.

The System of the current embodiment utilizes a server subsystem including a web server subsystem for generating both dynamic and static web pages as is known in the art, and for receiving data and/or commands from the user computer. One or more databases support the functioning of this server subsystem. The web server utilizes various scripting or other executable programs for providing dynamic content to the user's computer, which is attached to the web server via some computer network, such as the Internet, for example. The web server can also utilize various animated motion programs, such as a Flash program, java scripts, etc., to provide dynamic content to the user.

FIG. 1 shows a top-level block diagram of the Entertainment System 1, interacting with various users 10. The users 10 should have previously purchased and registered one or more toys from a Retail Merchant 9, who obtained the toys from a manufacturer 8, or via a distributor.

A user who has not yet purchased a toy can still access the System 10 to obtain information about the System and/or the toys, but will not, in an embodiment, have access to much of the site until a toy is purchased and registered.

The Entertainment System 1 is comprised of a server subsystem 2 for interacting with the users 10 via a user computer being operated by the user. The server subsystem can utilize a server 3, for serving content, including web pages, data, commands, and/or programs, for example, to the user computer. In addition, the server subsystem can include a reception subsystem 4, for receiving information and commands from the users 10. Alternatively, the server 3 and reception subsystem 4 might be combined into a single computer application, such as a commercially available web server, for example, running on one or more computers. The current system will utilize commercially available applications to implement much of the server subsystem.

The Entertainment System 1 also comprises a Storage Subsystem 5, for storing system data, user IDs and passwords, toy registration codes, personalized user information, etc. utilized by the various subsystems. The Storage Subsystem 5 of the current system will utilize a commercially available database application running on commercially available hardware, for example.

A Registration Subsystem 6 is used for registering the user and the user's toy into the system, so that the user has access to restricted portions of the system. The Registration Subsystem 6 may utilize its own dedicated application and hardware, or could be combined with or share the Server Subsystem 2 applications and/or hardware. The registration subsystem examines the registration code against stored data relating to a plurality of registration codes each representing a toy for sale.

A Virtual World Providing Subsystem 7 generates and/or provides the virtual world data to be served by the server 3 to the users 10 for use in displaying a virtual world on the user's computers. Portions of this data may be generated on the fly in response to user interactions, and portions are likely to be obtained and/or derived from data stored in the Storage Subsystem 5. (For example, in the current embodiment, items owned by the user (the items in the dock for example), the virtual room state [virtual furniture in the room for example], virtual cash, health, happiness, hunger parameters are all examples of "stored data", whereas data generated on the fly include position in the room [which also gets stored], and Arcade Game scores, all of which are described in more detail below).

Again, the Subsystem 7 may utilize unique applications and/or hardware, or may be combined with one or more of the Registration Subsystem 6 and/or the Server Subsystem 2 applications and hardware.

Figure 2:
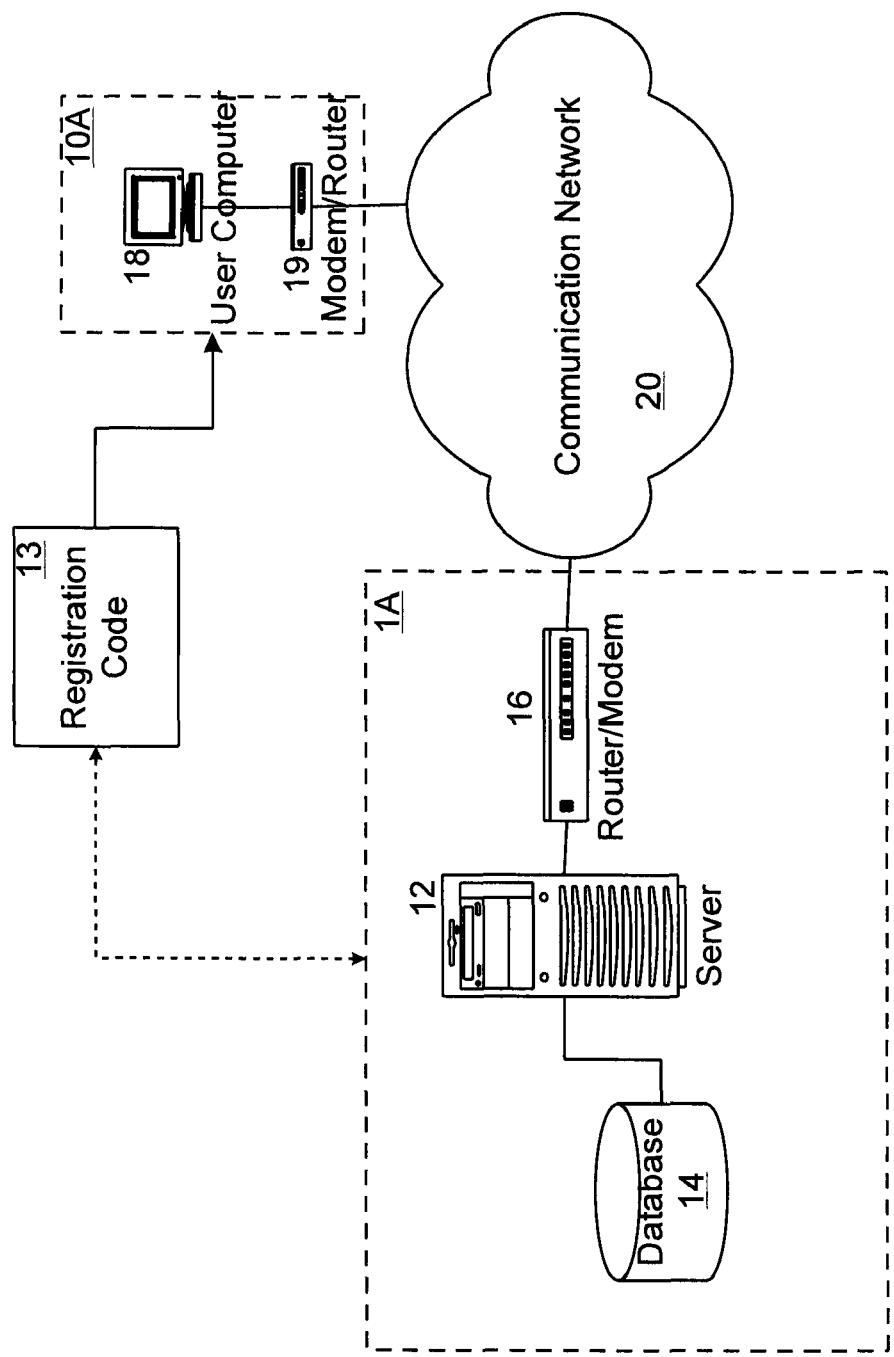
FIG. 2 shows a schematic diagram of a possible hardware implementation of an embodiment of the invention.

FIG. 2 shows an example implementation 1A of the Evaluation System 1, in one of its simplest forms. The system 1A comprises a server 12, a database 14, and a router/modem 16 to connect to a public communications network 20. A user 10A, utilizing a workstation 18, is also connected to the communications network via a router and/or modem 19, for example. In this implementation, the server 12, along with the database 14 and router/modem 16 and the appropriate software, implement all of the subsystem functions of the System 1 shown in FIG. 1 by executing various application programs on the server 12 hardware, for example. Of course, the system 1A may also support many additional users in a manner similar to that shown for user 10A, for example.

The current embodiment can utilize the Internet as the public communications network. However, other communications networks could be utilized, such as telephone networks, cellular networks, dedicated networks, cable TV networks, power lines, etc. Furthermore, combinations of these networks can be used for various functions. However, because of the ubiquitous nature of the Internet, a solution utilizing that diverse network (which can utilize many individual communications networks) is utilized in the current embodiment.

Furthermore, the System 1 might also utilize a private communication network for at least part of the system. For example, the Registration Subsystem 6 of FIG. 1 might be connected to a private computer network located at the retail store 8, where the user might register the toy, for example, as discussed in more detail below. Alternatively, the toy might automatically be registered at the time of purchase (e.g., by scanning a code at the register, for example), and thus not require any user interaction at all beyond purchasing the toy. Or the user might send in a registration card to implement registration, as another example.

Figure 3:
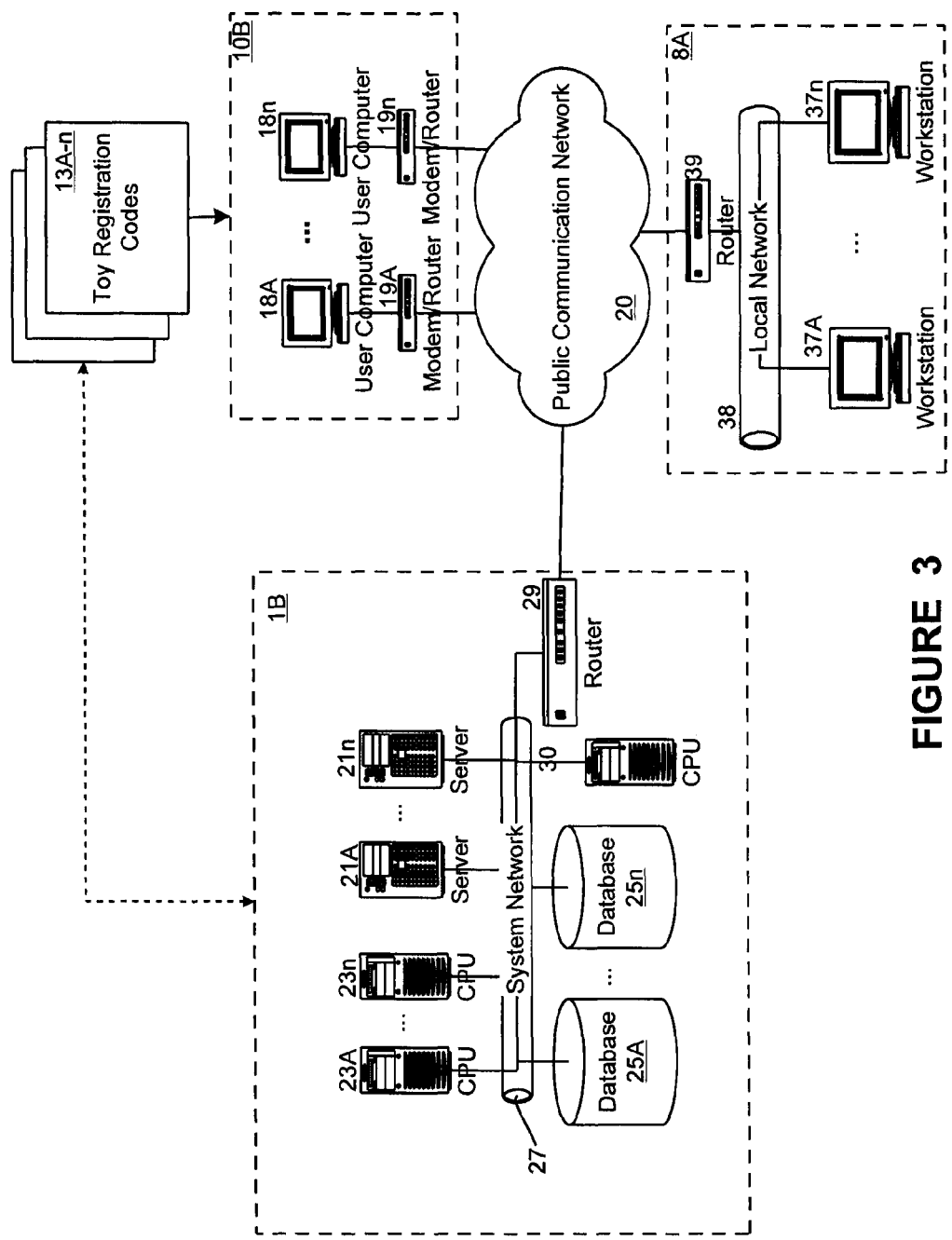
FIG. 3 shows a schematic diagram of a more complex hardware implementation of another embodiment of the invention.

FIG. 3 shows a more complex implementation 1B of the System 1. In this example system 1B, a plurality of servers 21A-21*n* can be utilized to implement the server subsystem 2 functions of FIG. 1. Furthermore, a plurality of CPUs 23A-23*n* can be utilized to implement the Virtual World Providing Subsystem 7 functions of FIG. 1. A plurality of database storage devices 25A-25*n* may be used to implement the Storage Subsystem 5 functions of FIG. 1. And a CPU 30 can be used to implement the Registration Subsystem 6 functions of FIG. 1, for example. Finally, a router 29 can be used to connect to the Public Communications Network 20

Note that, although FIG. 3 shows multiple servers 21A-n, multiple CPUs 23A-n, and multiple databases 25A-n, any of these might be implemented on one or more shared computers in various configurations, executing one or more computer program applications, as desired. As the number of users supported by the system 1C grows, additional hardware can be added to increase the capacity of the system, as necessary, in a manner similar to that shown in the Figure.

Continuing with FIG. 3 showing the more complex implementation 1B, a plurality of users can be supported in various configurations. For example, a plurality of users 10B operating single workstations 18A-18*n*, individually connected to the public communications network 35, can be supported. Furthermore, complex user networks can also be supported. Retailers and/or Toy Manufacturers might also have access to the system, as represented by the example shown in 8A, should an online-ordering system be implemented for selling toys. Of course, alternate implementations are also possible, depending on the types and number of users and/or retailers being supported, and also depending on the state-of-the-art computer technology.

In the current embodiment, the System uses an Apache web server running in a Linux environment. For webserver hardware, an Intel 2 Ghz+ CPUs with 2 GB RAM running Gentoo linux with the appropriate extensions (e.g., mod_php4 and mod_perl) can be utilized. The server will serve flash content to a web browser running a web browser application using PHP, Perl, and actionscript, and flash plugins. A MySQL database application will also be utilized for the storage subsystem.

The client (user) side Flash application make the calls to a number of PHP files. These PHP files then "interface" with the MySQL database to obtain the necessary data. All are served by the Apache web server, which can serve HTML, XML, along with the appropriate flash and other content. For multi-user environments (e.g., the multi user rooms discussed below) these are served by a socket server written in Perl.

This is effectively a 3 layer type of setup: Flash layer <--> PHP layer (this handles requests to the back end) <--> MySQL database. A dedicated database server running MySQL on a dedicated computer running the Gentoo linux OS can be used in the current system.

A secure Apache SSL server can be utilized for the registration subsystem, likely sharing the computer with the other Apache server.

An implementation of the current system can utilize an Apache Secure Web server for serving files over secure connection (HTTPS, SSL mode), and an Apache Web server for serving files over regular HTTP. A custom Socket Server, which is an XML socket server, written in PERL, is also utilized for providing independent environments for game sessions.

Items 242, 244, and 246 are parts of adoption center (discussed below), which is a flash application with PHP backend. Item 242 provides for user registration, using a form-driven flash application which validates the registration code and creates a user account within the system. A pet creation application 244, is a form driven flash application designed for guiding the user through pet creation process, and validating the registration code.

Authentication/Login process 246 is a flash application validating user credentials on the server side and spawning an API core in case of validation. It also has module designed for password retrieval based on collected user information, and currently passes user data to a client side API, and may in the future pass user data and a generated encryption key for a current session to a client side API.

Items 252 & 254 are different media (files) available on the server subsystem for user use. Item 254 represents Flash Movies and Games available for the user. Item 256 represents the server side API. Chat 262 and Multi-user games interactions API (MAPI) 264 are a part of Client side API and are used for setting up and maintaining connection to the socket server, authenticating the user, and work in a pass-through mode for multi-user games/environment to exchange messages.

The API can serve as a functional layer, serving end user applications (Flash games and such) with stored data (users statistics, virtual toys' properties, item parameters, etc.) retrieved from the database; it also is used to modify/enter certain data.

The scheme of the API is subdivided into Client part 280 (flash application) and Server part 270 (PHP script). Flash clip/movie Game 290 calls a function within the API client side [Core 283] passing a request to some arbitrary data. The Client side API [Generator 285] sends the request to [Parser 272] server side API. The Server side [Core 273] processes it and retrieves data from the database, wraps it in XML [Generator 274] and sends it back to the Client Side API [Parser 282], which calls specified a callback function within originator Flash clip/movie [Game 290] and passes received data to it.

To ensure users privacy, prevent cheating and preserve validity/authenticity of information, additional security layers can be designed which encrypts all data being passed back and forth in-between parts of the APIs (client/server).

The chosen Encryption technique of the current embodiment is a modification of TEA routines, using a Feistel cypher with a 128 bit key. Keys are generated at the login stage and securely passed to the client side via HTTPS, after which the adoption center spawns the client side API and passes the encryption data specific for the session. Additional measures which can be taken to prevent cheating and maintain data coherency include using different permutations of the original key for every data transmission.

Figure 4:
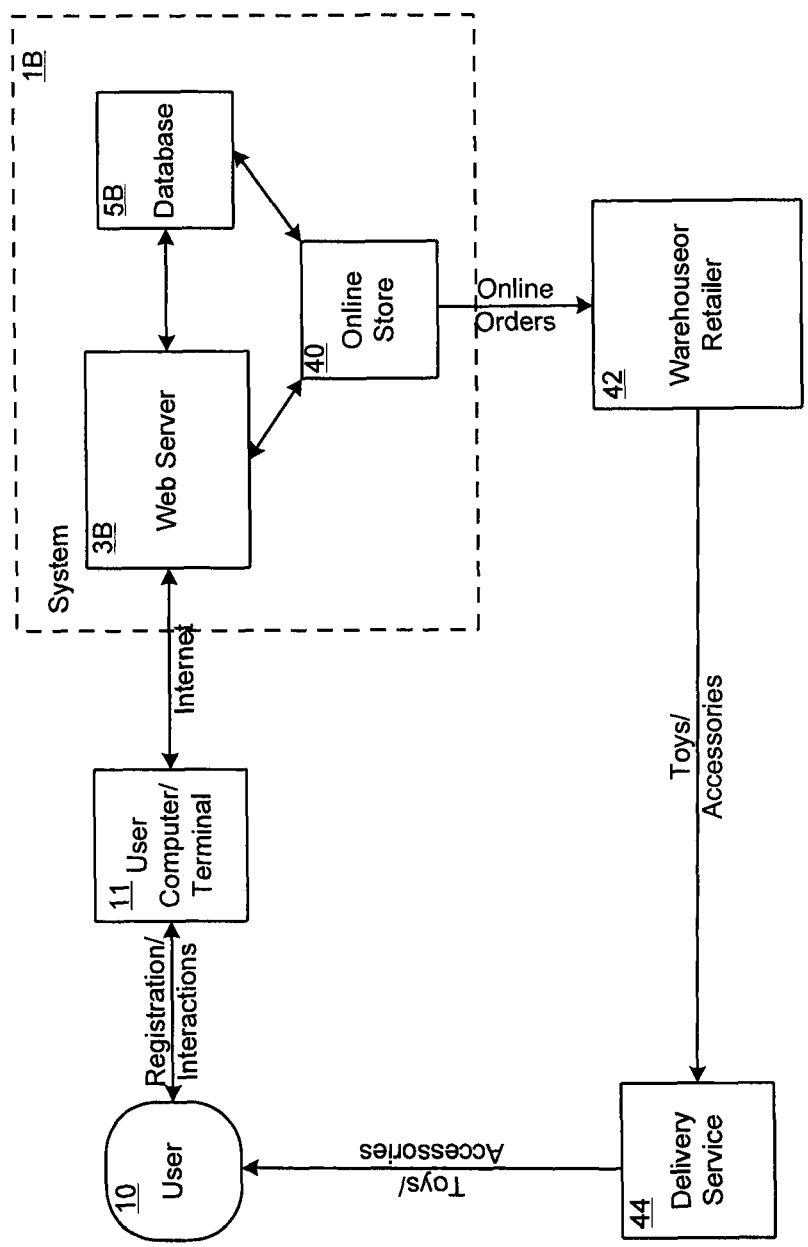
FIG. 4 shows a block diagram of another embodiment of the system and its interactions with some external entities.

FIG. 4 shows an alternate embodiment of the Entertainment System where the toys are sold to user via an online merchant. In this alternate embodiment, the Entertainment System 1B includes an online store 40 for a user 10 to purchase toys. The user 10 purchases the toys using the user computer 11, making an online payment using a credit card or online payment service, for example. A Warehouse or Retailer 42 then delivers the purchased toys, via a delivery service 44, for example, to the user 10. Registration of the toys could be automated, or as described above and below for a store-purchased toy.

One of the features of the Entertainment System in the current embodiment is to provide online User Games and Activities 110, which can be used to win more virtual cash 111. Some of these Games/Activities 110 are described in more detail below.

The collection of virtual cash 111 is for use in making "virtual purchases" of various "virtual commodities", for example. In the current embodiment, each registration of additional new toys adds an increasing amount of virtual cash, which is monitored and tracked by the System. The balance of the virtual cash is shown to the user when the user is participating in the virtual world. Virtual cash can be earned by playing games, successfully answering trivia questions, and via other means as well.

Furthermore, Virtual Cash 111 can be used to shop for one or more virtual rooms and/or virtual furnishings and accessories 114. These can be used to furnish one or more virtual rooms set up for the virtual character. Furthermore, by furnishing the virtual room(s) and adding virtual accessories, the well-being parameters 100 of the virtual toy can be improved by the System, especially the happiness parameter 101 and the health parameter 103. Thus, a user can improve these parameters by using virtual cash to accessorize and outfit the various virtual rooms.

In this manner, the Entertainment System uses the well-being parameters and virtual cash to help balance a platform for providing fun and activities, with an incentive to purchase new additional toys, and to increase the user's attachment to the physical toy. The fun and enjoyment obtained through the use of the system provides free word-of-mouth advertising, which also helps sell additional physical toys. In this manner, the Entertainment System is a marketing tool that will increase the overall sales of the toys, and thus provide a benefit to retailers selling the toys.

Figure 6:
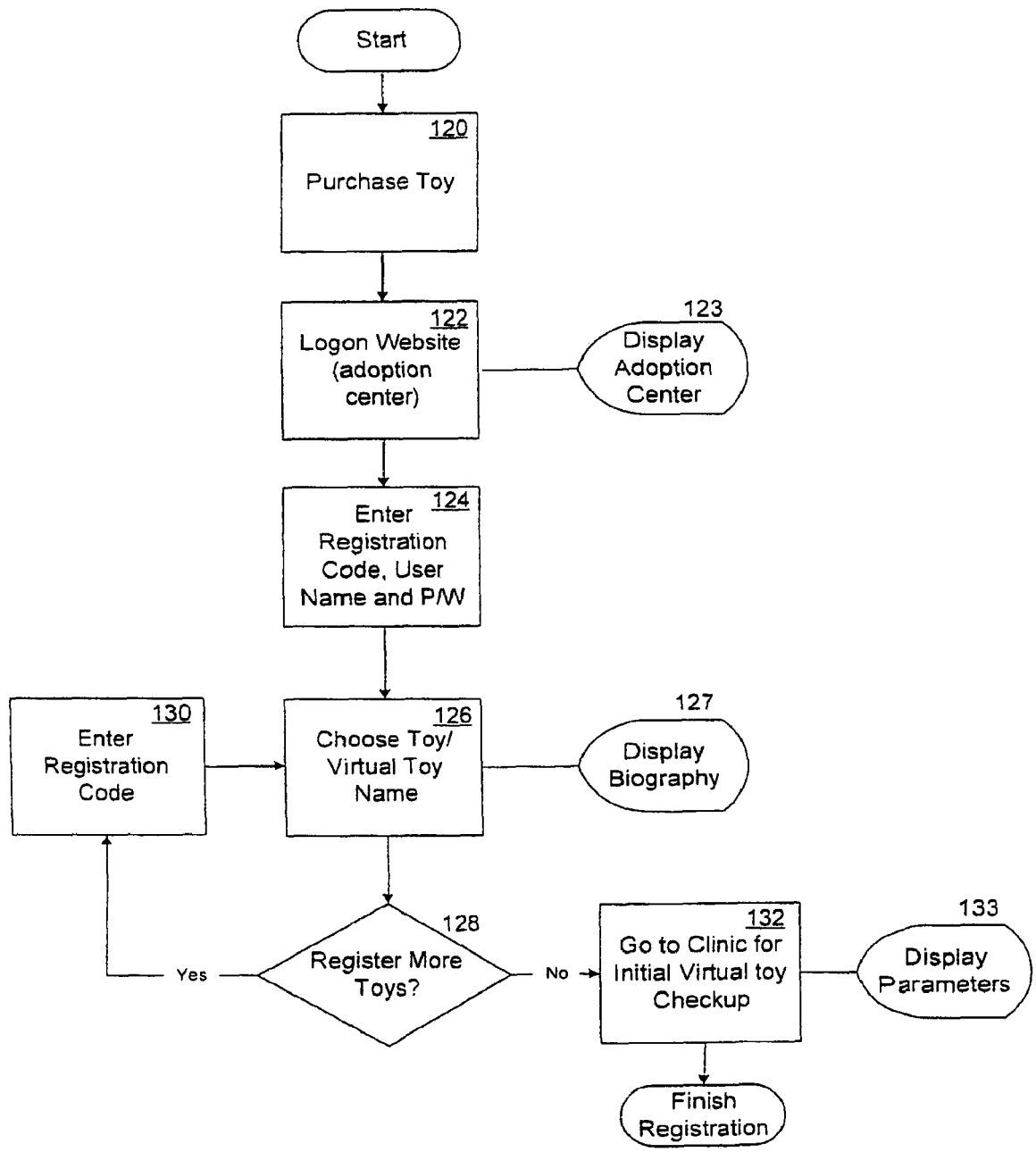
FIG. 6 shows a manner of a user registering with the System of the current embodiment for utilizing the System features.

FIG. 6 shows a preferred manner of a user registering with the System for utilizing the Entertainment System. The user typically makes a first purchase 120 from a retail store. However, in an alternate embodiment, online purchases might also be supported using an online store (as discussed above for FIG. 4), especially for subsequent purchases.

Figure 9:
FIG. 9 shows a sketch of an example toy according to the current embodiment.

The toys might be, for example, plush toy animals, robots, action figures, figures based on cartoon characters, vehicles, aliens, inanimate objects, other real-world items, etc. FIG. 9 shows an example sketch of a plush toy horse that might be purchased at a retail store and used for the Entertainment System. As a living creature that breathes gaseous oxygen from air for respiration purposes, the natural environment of the horse, the toy and the virtual character is considered to be the atmospheric environment of the Earth. Other environments in which the horse would be required the use of a life-supporting measure to support respiration are considered unnatural environments for purposes of the present application. For example, to enable the horse and the virtual character representing the horse, the toy or both the horse and the toy to exist underwater for an extended period of time, a self contained oxygen supply or other suitable life-sustaining measure is to be provided to the horse.

Figure 10A:
FIGS. 10A and 10B show the front and back of a tag listing the System website address and a registration code according to the current embodiment.
Figure 10B:

The toy will be paired with a hang tag or other device having the system website address and a registration code imprinted thereon or stored therein. For example, in the current embodiment, a simple paper or cardboard hang tag, as shown in FIGS. 10A (front) and 10B (back), has the website (FIG. 10A) and the registration code (FIG. 10B) imprinted on the tag.

In an alternative embodiment, an electronic storage device, such as a USB key, or wireless RF tag or Bluetooth device, is embedded within or provided with the toy and/or its packaging at purchase. The electronic device would then have the registration code stored in the device using electronic memory (RAM, ROM, EEPROM, etc.), for example. As electronic storage devices become cheaper, using such a device for storing the registration code may become the preferred approach.

Figure 11A:
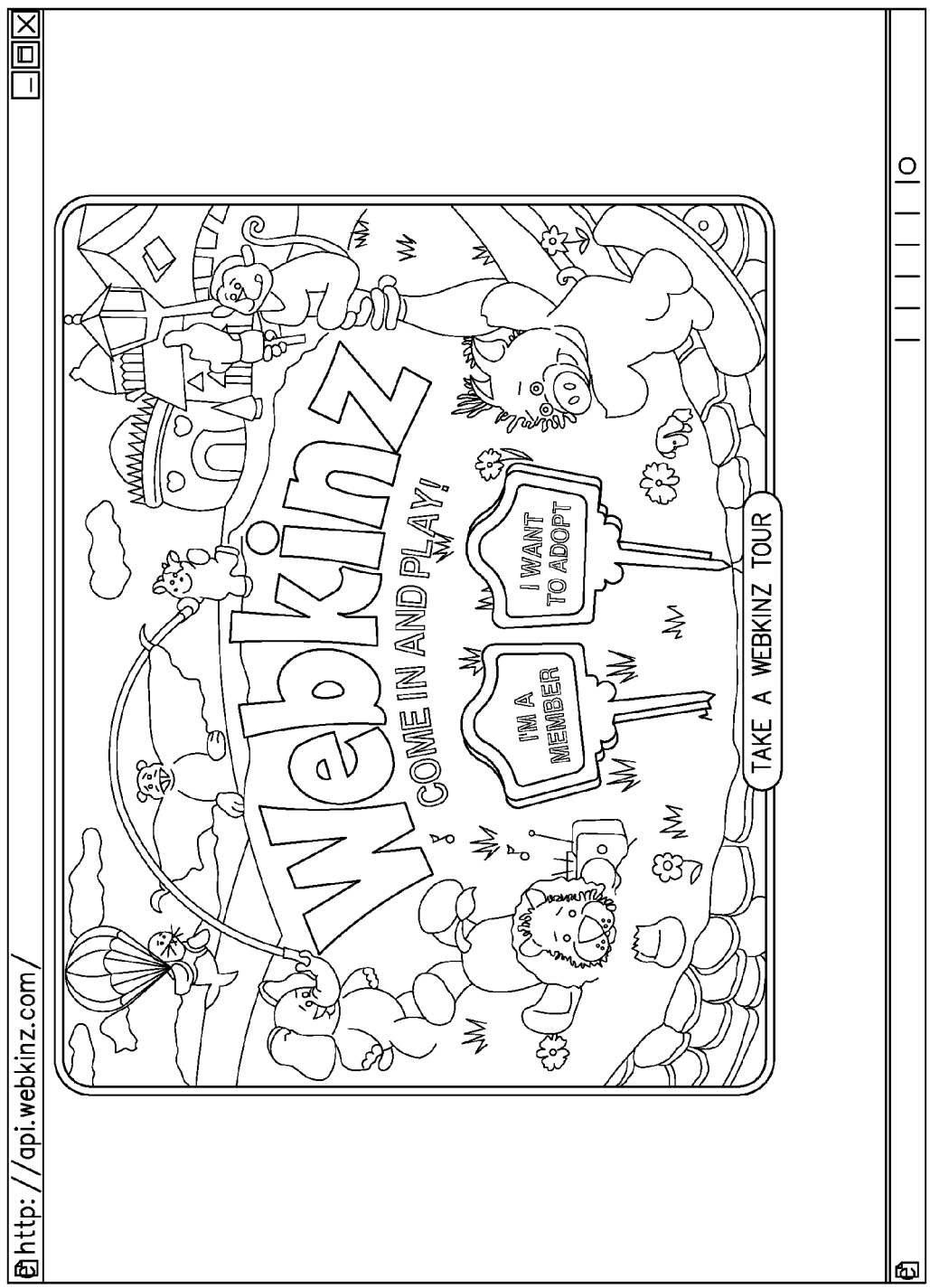
FIGS. 11A-11F show example screen shots of the website as possibly seen by a user of the system of the current embodiment.
Figure 11B:
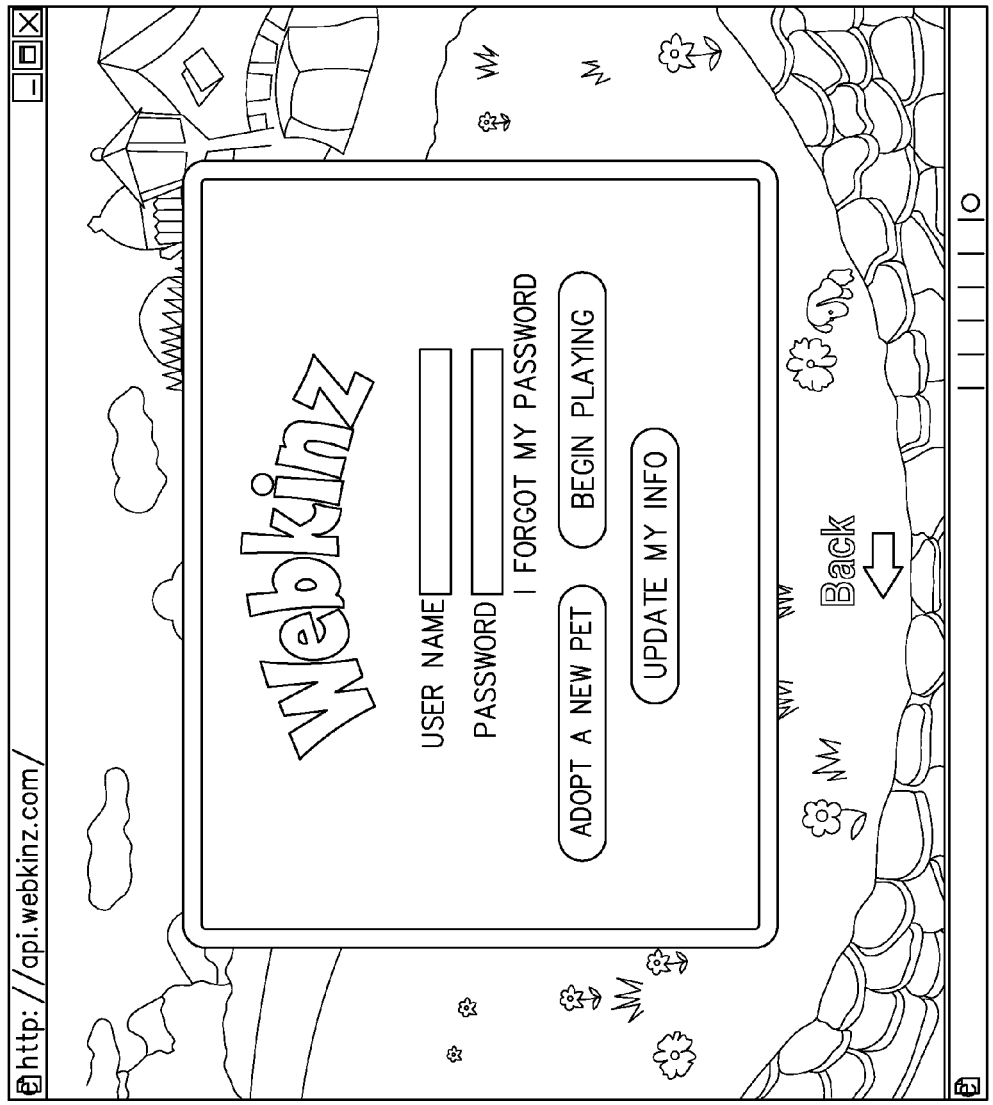

For the current embodiment, after the user takes the toy home, the user begins the registration process by visiting the Entertainment System website using the address on the tag and a user computer via an Internet connection to load the home page (see screen shot FIG. 11A) and logging on to the System website (see screen shot FIG. 11B) to load the adoption center 122. The System then displays an adoption center page (item 123 of FIG. 6), an example of which is shown in screen shot FIG. 11E.

In the current embodiment, the user then registers the toy, thus receiving access to the various online features of the invention, as discussed herein.

The registration process 124 of the current embodiment is performed by manually entering the registration code printed on the registration tag via the user computer connected to the Internet. The user also chooses a user ID and password. The System can ensure that at least the combination of ID and password is unique, or might also insure that each user ID is unique as well.

Personal information might also be requested in order to recover user ID and password information. Such personal information might be a favorite color, user's birthdate, etc.

In an alternative embodiment using an electronic storage device with the registration code stored therein, the electronic device will communication with the user computer via a corresponding device, and thus automatically or manually transfer the registration code to the user computer. For example, the System could request that the user plug in a USB key into the user computer at the appropriate time, or the user computer may wirelessly read an RF or Bluetooth device located in or on the toy.

In the current embodiment, after the user enters the registration code, and before or after the user enters the user ID and password, the System checks the registration code in any one of a number of ways. In essence, the system uses stored data relating to all of the registration codes associated with corresponding toys for sale.

The system might check the registration code against a list of valid registration codes stored in the system database, for example. In this case, the stored data are the actual registration codes themselves. If there is a match, the registration code has been validated, and the system then determines the type of toy that the user purchased based on information stored with the registration code in the database. For example, each code could be linked to information about the type of toy (e.g., a type of real creature to be represented by the virtual character, such as a basset hound, a fish, a lion, a robot, a soldier, etc.), its coloration and appearance, its temperament, etc.

The natural environment, unnatural environment or both the natural and unnatural environments of the real-world object represented by the toy can optionally be linked to the code. Thus, when registration occurs, the Entertainment System can present to the user a virtual room 1400 (FIG. 5) representing the natural environment of the real-world item represented by the toy being registered. Providing the user with the virtual room 1400 representing the natural environment of the real-world item represented by the toy being registered can optionally occur automatically, without further user intervention following registration.

In such an embodiment discussed above, it would be beneficial to make each registration code unique and complicated, in order to make it difficult for an imposter or unauthorized user to make up a code or use a previously registered number to obtain unauthorized access or unauthorized additional virtual toys.

As an alternative, after being entered, the registration code may be verified using a mathematical algorithm to determine its authenticity. Such an algorithm might also be used to determine the type of toy being registered. For example, all lion plush toy registration codes might start with the letter "L", and might use a following number that can be factored into exactly 5 prime numbers, for example, or the number might fall into a particular range or format. Another example is the use of an algorithmic pass-code based on a central key value. In these examples, the stored data relating to the registration codes provides the proper information to perform the validation process (e.g., the proper letters, number ranges, acceptable factors, the central key, or the algorithm itself). Accordingly, by these methods, the actual registration numbers need not be stored, but could still be verified. Then, perhaps by storing the registered registration code, uniqueness could be guaranteed by never allowing that same code to be used again.

Of course, additional techniques can be used to determine a registration code authenticity as well, as long as the registration process ensures that it is likely the user has purchased a valid toy, and thus is an appropriate user of the system.

Referring again to FIG. 6, after validation and registration has occurred, and the user name and password accepted, the user is prompted to provide a name for the virtual toy 126 (or in an alternative embodiment, one is suggested by the site). The system can then display a biography of the virtual toy 127, and can also show the user what the appearance of the virtual toy will be. The biography may show such items as a virtual birth certificate, adoption certificate and/or information, likes and dislikes and favorite foods of the virtual toy, etc. The biography may be related to the personality/temperament of the virtual toy, the type of toy, etc. A virtual identity for the toy is thus created by the System, including the biographical information, the name provided by the user, etc.

The user might then be prompted to register any additional toys (128 & 130), if any. Finally, the System might provide the user with an initial virtual medical checkup 132 for the new virtual toy at a virtual clinic (see screen shot FIG. 11D for an example view of the clinic). The toy's wellness parameters can then be displayed to the user for the first time, and the registration process is thereby finished, and the user now has access to at least some of the restricted portions of the Entertainment System website.

Note that alternative means of registering the toy are also possible in alternative embodiments. For example, the user might phone in the registration code using a telephone, and be given a user ID and password, or choose one over the phone. Or the user may register the toy at the place of purchase using a dedicated or general purpose computer on a private network. Or, if the toy is purchased online, the registration might occur at the time of purchase, before the user has obtained the actual physical toy. Thus, different communication networks may be utilized for registration as are utilized for website access, for example.

In an alternative embodiment, the scenes might be customized based on the type of toy. For example, a basset hound plush animal could be shown in any natural environment, such as an urban landscape or setting. Likewise, a cow could be shown in the countryside, a monkey in the jungle, and a lobster under the sea, as additional examples.

Furthermore, in another embodiment, each type of toy might have different traits that can impact the way the toy reacts based on the type of toy. Thus, a toy lion might be a mean carnivore, while a toy monkey eats fruit and is playful, for example. Soldiers might be aggressive, while dancers are graceful, for example. Thus, any of the above concepts are not limited to animal toys, but could easily support other toys such as human dolls, robots, machines, soldiers, etc.

Having virtually adopted their toy by registering it with the System, the user can then participate in a variety of online games, some involving the virtual representation of the toy (i.e., the virtual character). These games can include adventure games, trivia games, arcade-style games, and the like. Participants can collect "virtual cash", which is virtual money which can be spent to purchase virtual items such as virtual rooms for their toys, as discussed herein. This virtual cash may or may not be useable at other sites, and may or may not represent legal tender.

Furthermore, a participant may purchase additional toys, register them, adopt them, and thus add them their virtual world, creating additional virtual characters. Creating another virtual character in such a manner can also grant the user access to a virtual room 500 representing the natural environment of the newly created virtual character. These purchases are preferred to be actual toy purchases using legal tender where the user obtains a real toy. However, in an alternative embodiment, "virtual characters" represented only online might also be utilized, whether purchased with legal tender or merely online "money".

Each of the new toys is, after registration, represented as a virtual character which can interact with other virtual characters (including those created to represent other actual toys) owned by the user or owned by other users, including team game play, for example. Participants can also chat with other registered users using online chatting or posting features. The current embodiment utilizes a symbol chat with preset icons, rather than general text chat, to protect children from inappropriate language. However, generalized chatting features could also be added, such as provided by a commercially available chat program, for example.

Figure 7:
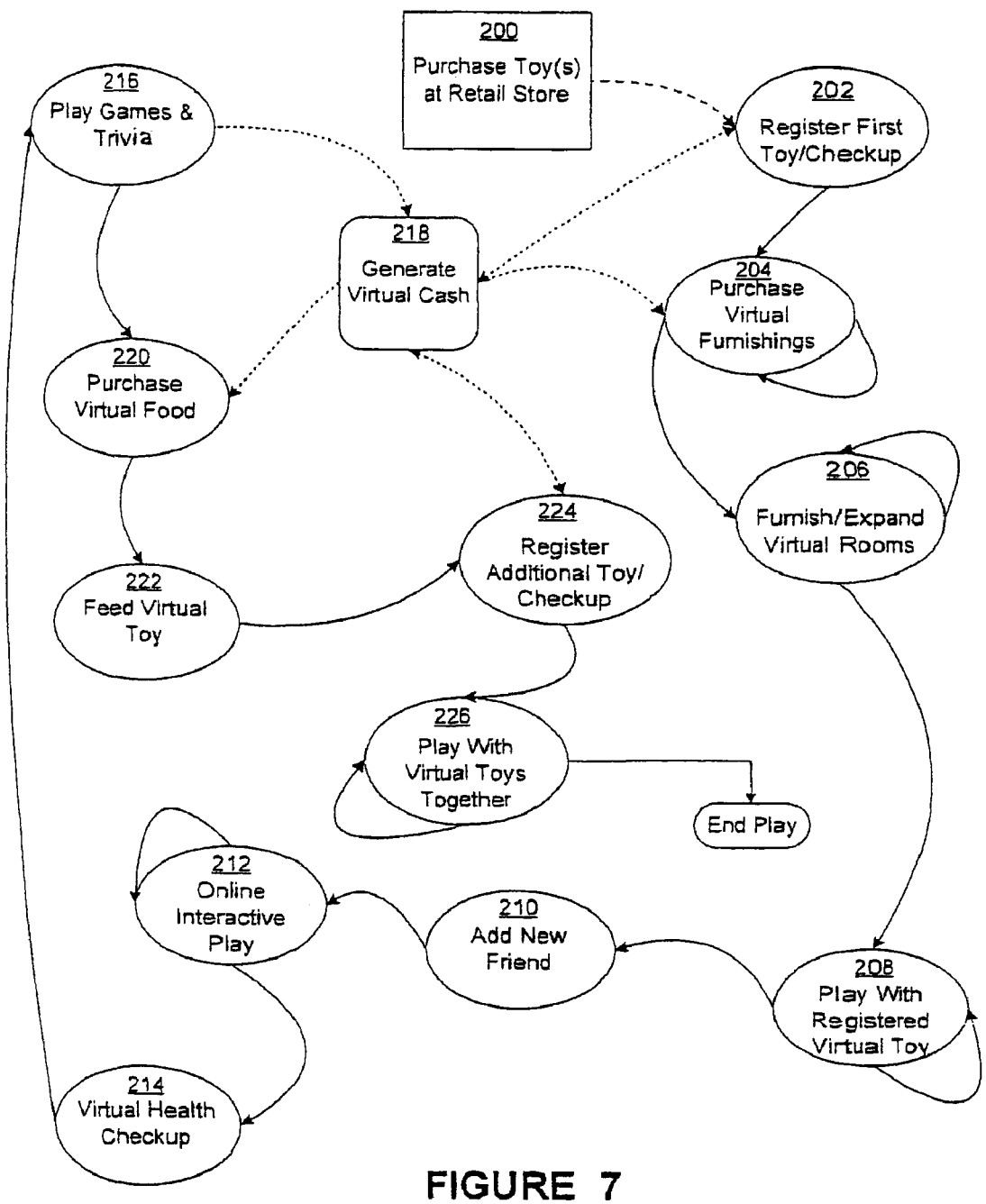
FIG. 7 shows an example of how a user might utilize the System of the current embodiment.

FIG. 7 shows an example of how a user might utilize the Entertainment System for a session or two. First, the user purchases one or more toys 200. Then, the user registers one of the toys 202, as described above. The user then purchases virtual furnishings and virtual accessories 204 for the virtual toy, and uses the purchased items to furnish the toy's virtual rooms 206. The user can virtually move the furnishings around the room by "point, click, & drag" operations, for example, thus testing various types of decorating schemes. The user can also paint/wallpaper the room, provide flooring, etc. all of which were purchased 204.

If the user bought additional toys, the user can register the additional toys 224, which will also generate additional virtual cash 218. The user can then use both the original virtual character and the additional virtual character to play together, increasing the happiness parameter of both virtual toys, and perhaps making the toys hungry. The user then might end their online activities, or continue with additional online activities in a similar manner.

Figure 8:
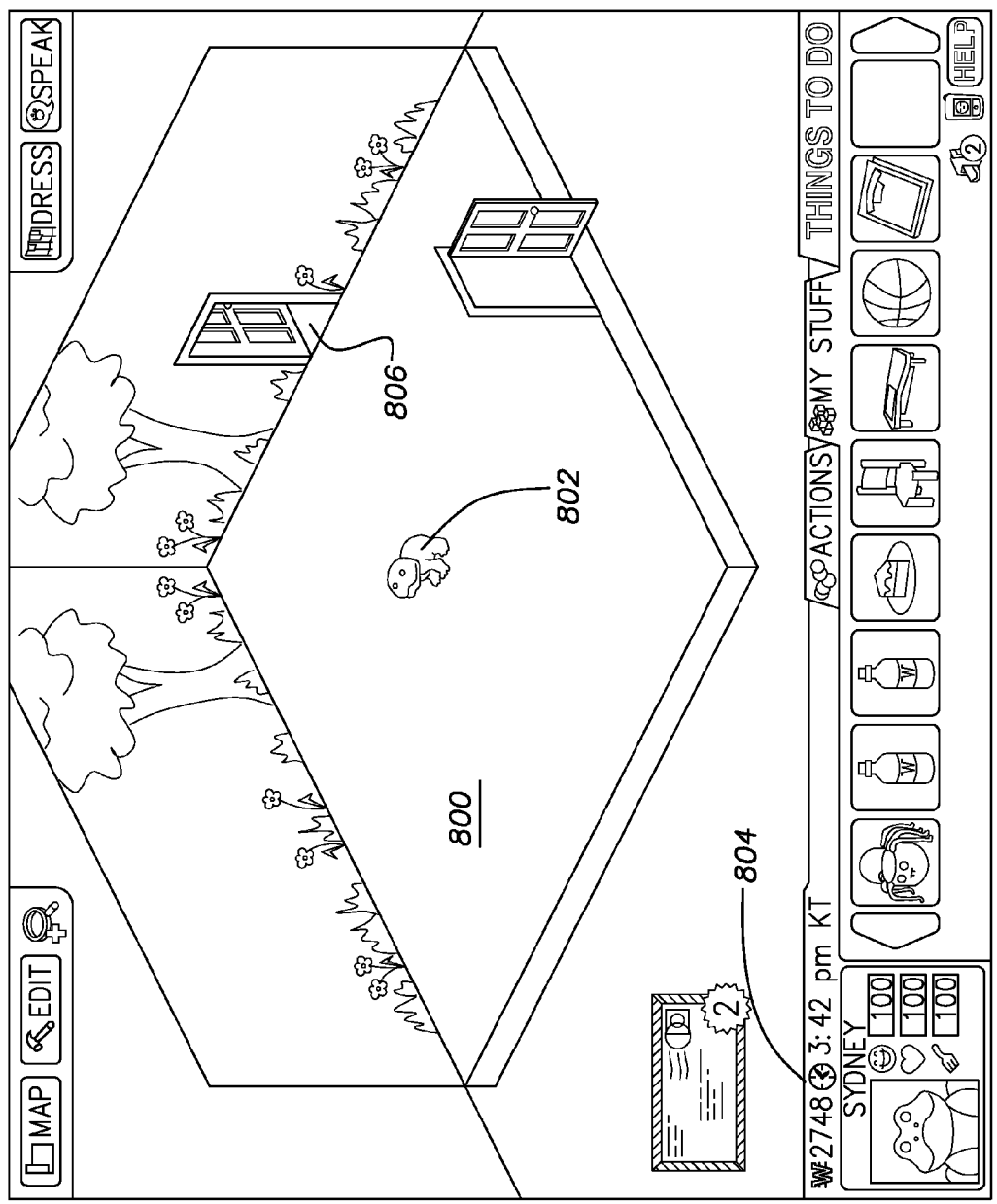
FIG. 8 shows a screen shot illustrating a virtual room representing a natural environment of a toy, which represents the real-world frog, wherein the natural environment represented by the virtual room is an airy, atmospheric environment.

With reference to the screen shot shown in FIG. 8, following registration of an initial toy to create a virtual character 802 the user is provided with a virtual room 800. Initially, the user can be provided with a starting amount of virtual cash, the remaining amount 804 being indicated in the virtual currency portion of the dock, for example. The virtual room 800 can optionally start empty as shown in FIG. 8, or the virtual character and/or user can be provided with initial furnishings.

The virtual room 800 generated in the virtual presentation will represent the natural environment of the real-world item that represented by the toy, and accordingly the virtual character 802. For the embodiment shown in FIG. 8, the virtual character 802 represents a frog, which falls in the class of living creature real-world items. The frog breathes air from the atmospheric environment of the Earth, and as such, the natural environment represented by the virtual room 800 is a gaseous environment, namely the atmospheric environment of the earth including air that can be utilized for respiration.

In the current embodiment, the virtual items in the virtual world can be made to interact with each other. For example, the virtual toy might sit in virtual chair, or climb on top of a virtual table. The virtual toy might walk around the virtual world, and play with its own virtual toys. Virtual toys may play and interact with each other. Virtual accessories might be placed on a table, and virtual pictures "hanged" on a virtual wall. Virtual chairs might be moved around, and slid up to a virtual table. The virtual toy might sit in a chair. Virtual food might be placed on a virtual plate, for example, and the virtual toy may simulate eating the virtual food. Thus the user is provided with an animated display of these interactions, including both video and/or audio components. In this manner, the virtual world simulates activity in the real world.

The user can also zoom in and out of various views, virtually move from room to room (i.e., display different rooms), etc, by manipulating the mouse and keyboard of the user computer.

The virtual character's virtual room 800 is made up of a series of animated (e.g., Flash based) screens that depict the virtual room or rooms where the toy "lives", "eats" and "plays". In the current embodiment, a single isometric view of the room is provided. The virtual room can, in time, be converted into a large virtual house or even multiple virtual houses, through the use of room expansions via spending the virtual cash, for example. In the current embodiment, the user can purchase virtual flooring and virtual wallpaper or paint, and virtual furnishings, to prepare the virtual room for the virtual toy. See FIG. 11C for the screen shot of an example virtual pet room already furnished, showing an animated pig as the virtual pet.

Virtual outdoor yards, that have their own virtual furniture and exclusive virtual objects (i.e. trees) that cannot be placed inside the house, for example, can also be provided for "purchase" using virtual cash.

Figure 11C:
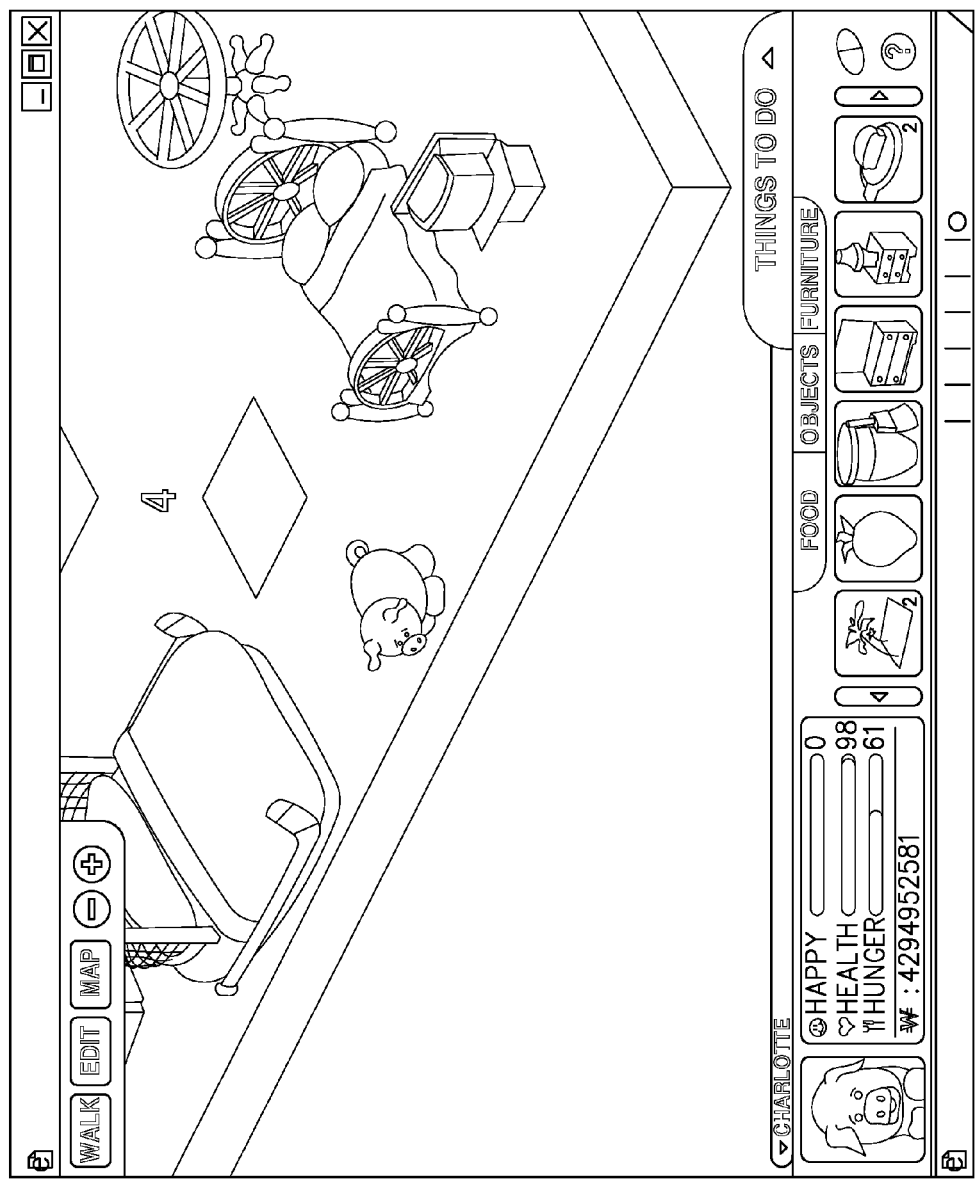
Figure 11D:
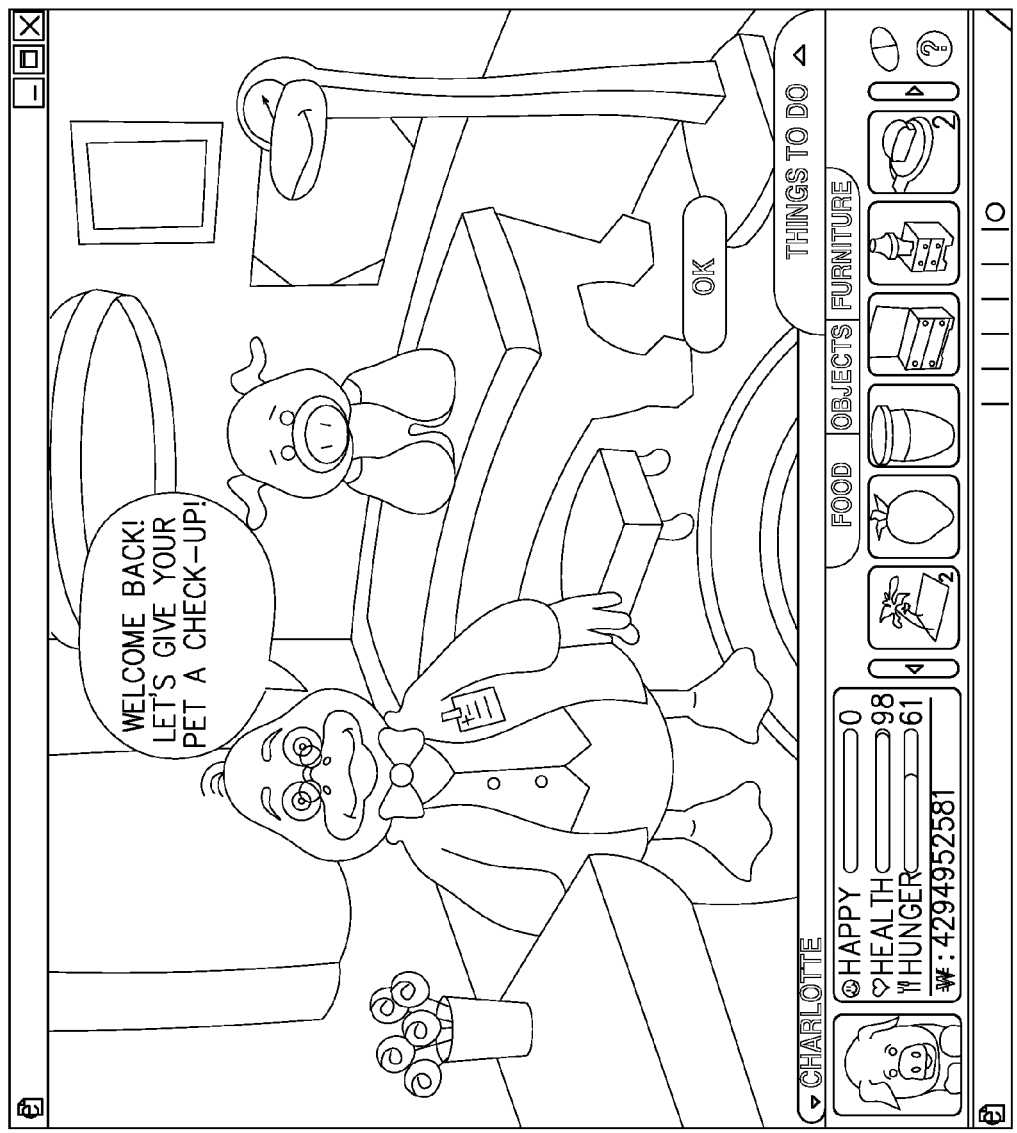
Figure 11E:
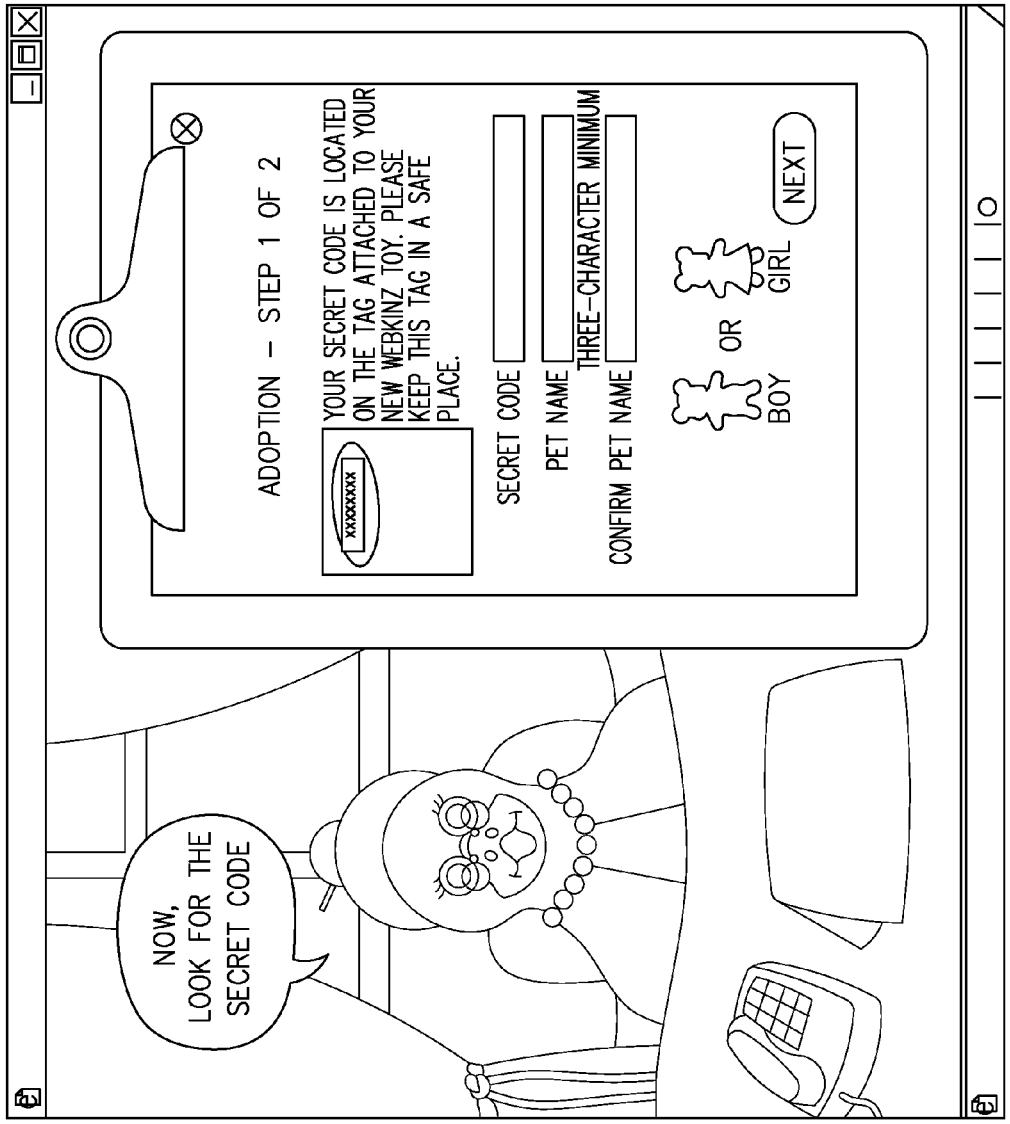

In the current embodiment, a user interface section located at the bottom of the window known as the "dock", or "Control Panel" is provided, as shown in the example virtual room screen shot of FIG. 11C, showing the dock at the bottom of the screen shot. The user may virtually store many or all virtual purchases, collectibles, and adventure objects in the dock, (some of which are functional, such as a virtual calculator for example) or place them throughout the room by dragging them from the dock. The dock displays a visual description of the virtual toy's well-being parameters (e.g., a numerical index), as the toys need food and attention to remain healthy and happy. Also in the dock are the user's points level, and available "virtual cash" earned in virtual games and adventures that can be used throughout the site.

In an alternative embodiment, there might be a number of views (e.g., 3) of the room, and each scene might be accompanied by the dock.

If the user has multiple registered virtual toys, the dock interface will allow the user to switch between toys and view them when not in use. Furthermore, a plurality of virtual toys might be moved into a room for interactive play, for example.

Further, the user can add friends to a friends list, and then the friends can virtually visit each other's rooms, each seeing the same room and playing with their virtual toys, both interacting with the room objects, and chatting using a chatting tool, for example. In the current embodiment, the chatting tool can use "chat symbols", for example, rather than using typed words, so that pre-defined phrases can be chosen and transmitted to the other participant.

As with the other real-world items having a virtual counterpart, the term respiration as used herein does not require actual respiration, or even simulated respiration to occur in the natural environment in the virtual presentation. In other words, while simulated respiration may be performed by the virtual character 802, alternate embodiments can optionally include a virtual character 802 that does not appear to perform respiration, and there may not be a respiration or oxygen-level parameter in the virtual presentation. The respiration of a living-creature virtual character 802 can be just symbolic as a reference for distinguishing the natural and unnatural environments of the virtual character 802.

While the virtual character 802 is in the virtual room 800 representing the natural environment of the real-world item represented by the toy, the virtual character 802 is displayed as would be the real-world item in its natural environment. An environment extension tool such as the artificial life-sustaining measure is not required while the virtual character 802 is in the virtual room 800 since the virtual character 802 is in its natural environment where respiration can take place freely.

Figure 12:
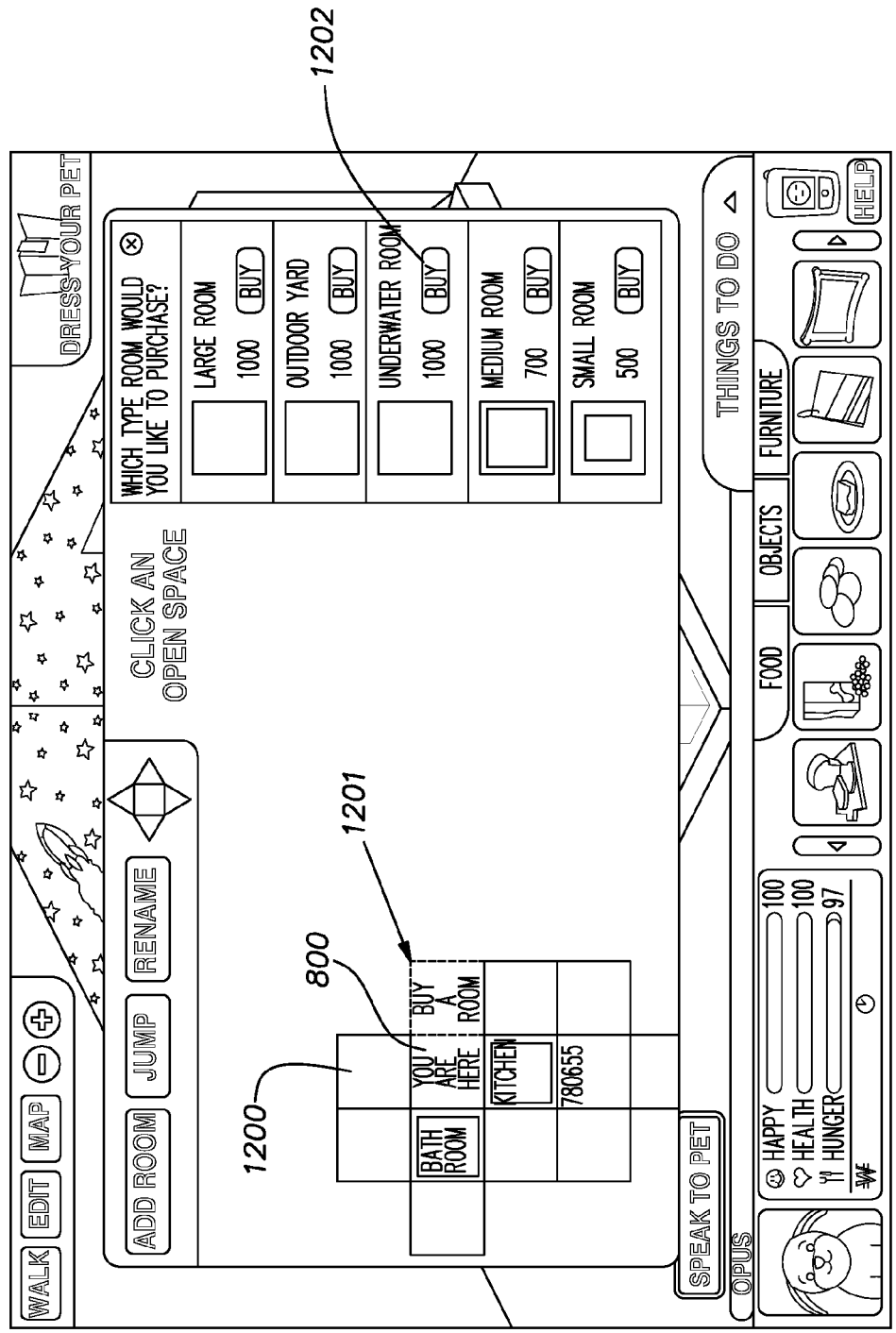
FIG. 12 shows a screen shot providing an example of an underwater room purchase menu and an overhead schematic illustrating the relative positions of the virtual rooms.

The virtual room 800 can include a virtual door 806, stairwell (not shown) or other passageway leading from the virtual room 800 representing the natural environment of the virtual character 802. Another virtual room, outdoor space and the like (collectively the "other virtual room 1200") can be located adjacent to the virtual room 800 representing the natural environment of the virtual character 802. The other virtual room 1200 represents an unnatural environment for the virtual character 802. For enhancing the user's enjoyment of the System, a hull door or other suitable barrier can optionally be provided between the virtual room 800 and the other virtual room 1200 to create a life-like feeling that the two environments are truly separated. An overhead schematic 1201 of the relative arrangement of the virtual rooms can be displayed by the System as shown in FIG. 12, which is an Underwater Room Menu in the current embodiment. A suitable room menu can be provided to facilitate the purchase and arrangement of virtual rooms representing other environments.

Figure 11F:
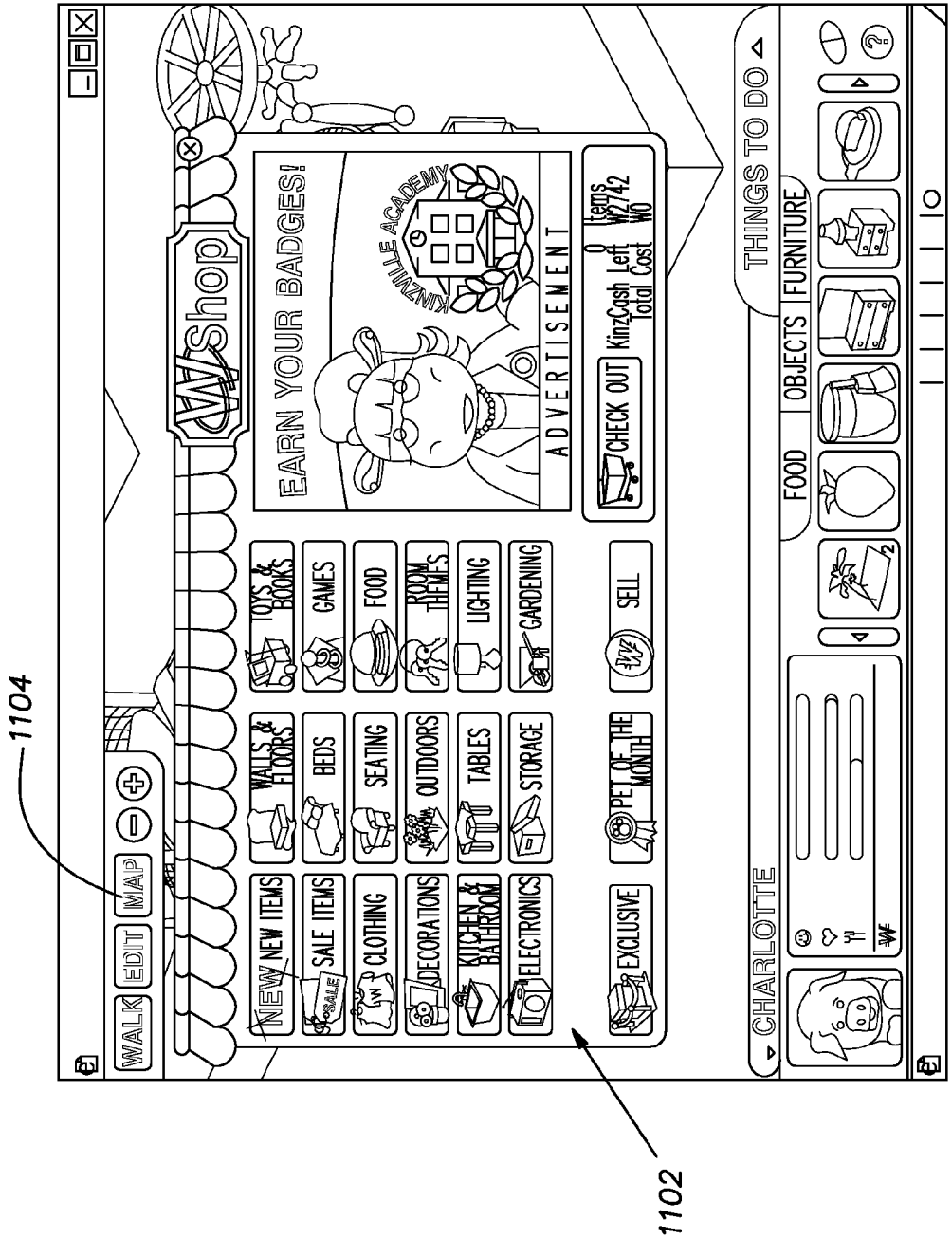

The user can acquire and add the other virtual room 1200, which represents an unnatural environment of the virtual character 802, to the virtual presentation. This can be accomplished by purchasing the other virtual room 1200 using virtual cash, registering and adopting another toy representing a real-world item that naturally exists in the environment represented by the other virtual room 1200, and the like from a virtual retailer such as the "WShop" depicted in FIG. 11F. The user can enter the WShop or other portion of the virtual environment where virtual shopping can be performed and select an appropriate menu selection from among the available menu selections 1102. The appropriate menu selection can be a dedicated underwater room selection, or can be included in an existing available selection 1102 such as "Room Themes" or "New Items" for example. According to alternate embodiments, the user can select a "Map" selection 1104, which can display an overhead schematic of the virtual rooms along with a menu allowing for the purchase of an underwater room or room having any other type of environment as shown in FIG. 12. First considering the purchase of the other virtual room 1200, as shown in FIG. 12 the user can select via manipulating the mouse of the user computer the "BUY UNDERWATER ROOM" option 1202. Using the overhead schematic view, the user can locate the other virtual room 1200 next to the virtual room 800, which is already occupied by the virtual character 802. The virtual character 802 can exit virtual room 800 through the virtual door 806 shown in FIG. 8 to enter the other virtual room 1200.

The other virtual room 1200 can also be acquired by the user when registering and adopting another toy representing a real-world item whose natural environment is represented by the other virtual room 1200. For instance, the user may purchase and register a toy fish, thereby creating another virtual character representing a fish, and granting the user access to the other virtual room 1200 representing an underwater aquatic environment. The user can again refer to the overhead schematic to arrange the location of the other virtual room 1200 as desired. According to alternate embodiments, limits can be placed on the other virtual rooms 1200 given to the user as a result of registering and adopting toys. For example, the user might only be given the other virtual room 1200 for each toy that the user has registered and adopted, up to ten such toys. Any toys subsequently registered and adopted by the user after ten will no longer result in another of the other virtual rooms 1200 being given to that user.

Upon entering the other virtual room 1200, the virtual character 802 has gone from its natural environment to an unnatural environment. As discussed above, the virtual character 802 can not exist for an extended period of time in the unnatural environment without an "environment extension tool". The environment extension tool can be any item that serves to at least partially extend the natural environment of the virtual character 802 into the unnatural environment of the virtual character 802. By using the environment extension tool, the virtual character 802 is permitted to exist in the unnatural environment for an extended period of time.

Figure 13:
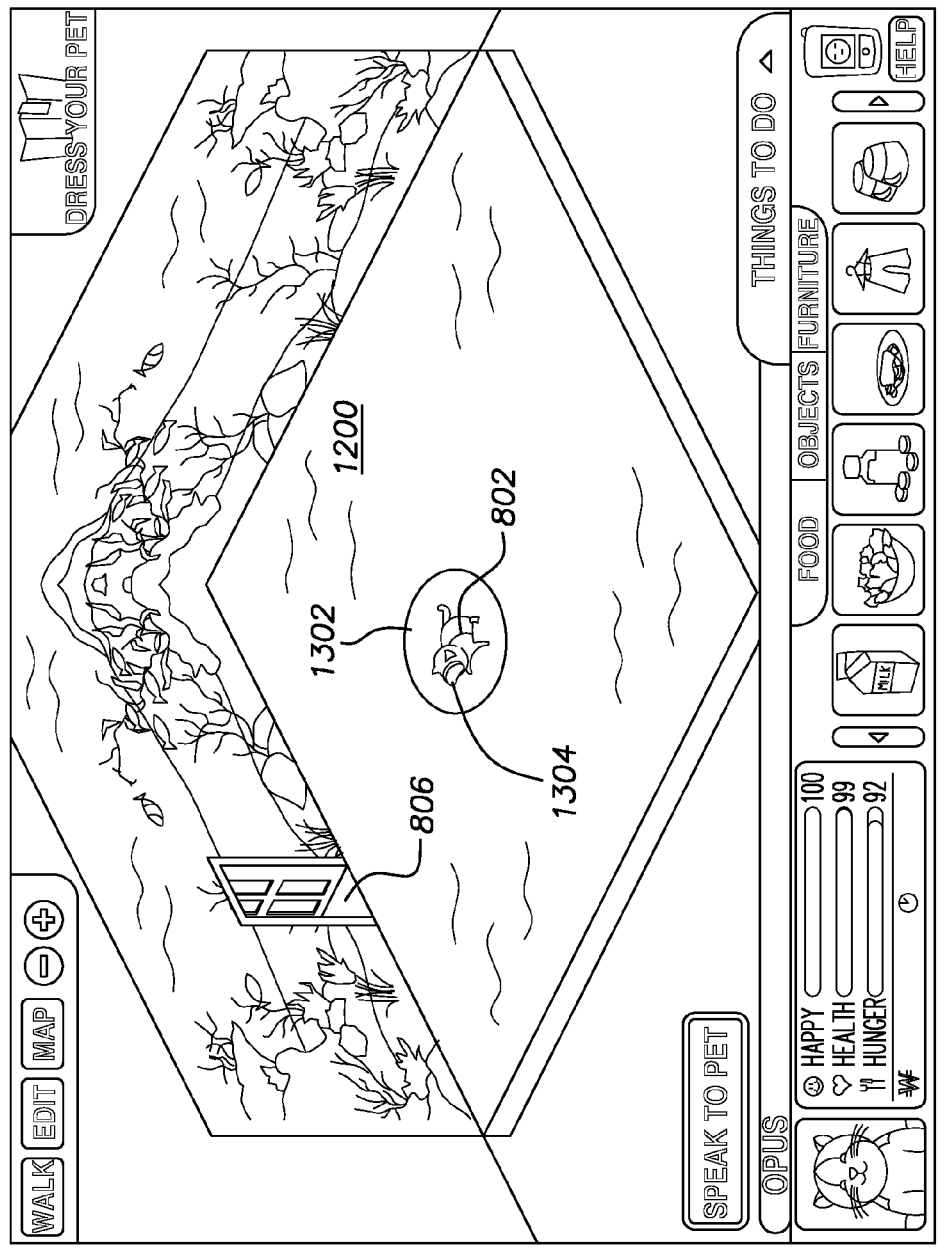
FIG. 13 shows a virtual character representing a toy cat provided with an environment extension tool, and more specifically a life-sustaining measure in the form of an air bubble while the virtual character is in an unnatural environment.

Consider, for example, the transition of the virtual character 802 from the airy, atmospheric environment represented by virtual room 800 in FIG. 8 to an underwater, aqueous environment represented by the other room 1200 shown in FIG. 13. Responsive to a command from, and under the control of the user the virtual character 802 is instructed to pass through doorway 806, thereby leaving the virtual room 800 and entering the other virtual room 1200. Upon entering the other virtual room 1200 the virtual character 802 is provided with an environment extension tool in the form of an air bubble 1302 and a diving mask 1304. Since the virtual character 802 represents a living creature in the virtual presentation, the air bubble 1302 and diving mask 1304 are referred to herein as a life-sustaining measure, allowing for respiration of the virtual character 802 even in the underwater, aquatic environment of the other virtual room 1200, which is an unnatural environment of the virtual character 802.

The air bubble 1302 fully envelops the virtual character 802 in the embodiment shown in FIG. 13. However, the air bubble 1302 or other life-sustaining measure utilized to permit the virtual character 802 to visit the unnatural environment represented by the other virtual room 1200 can take any desirable form. For example, the air bubble 1302 can optionally envelop just the head of the virtual character 802. As another example, the air bubble 1302 can be replaced by a SCUBA tank and air mask (not shown), or any other suitable life-sustaining measure.

Figure 5:
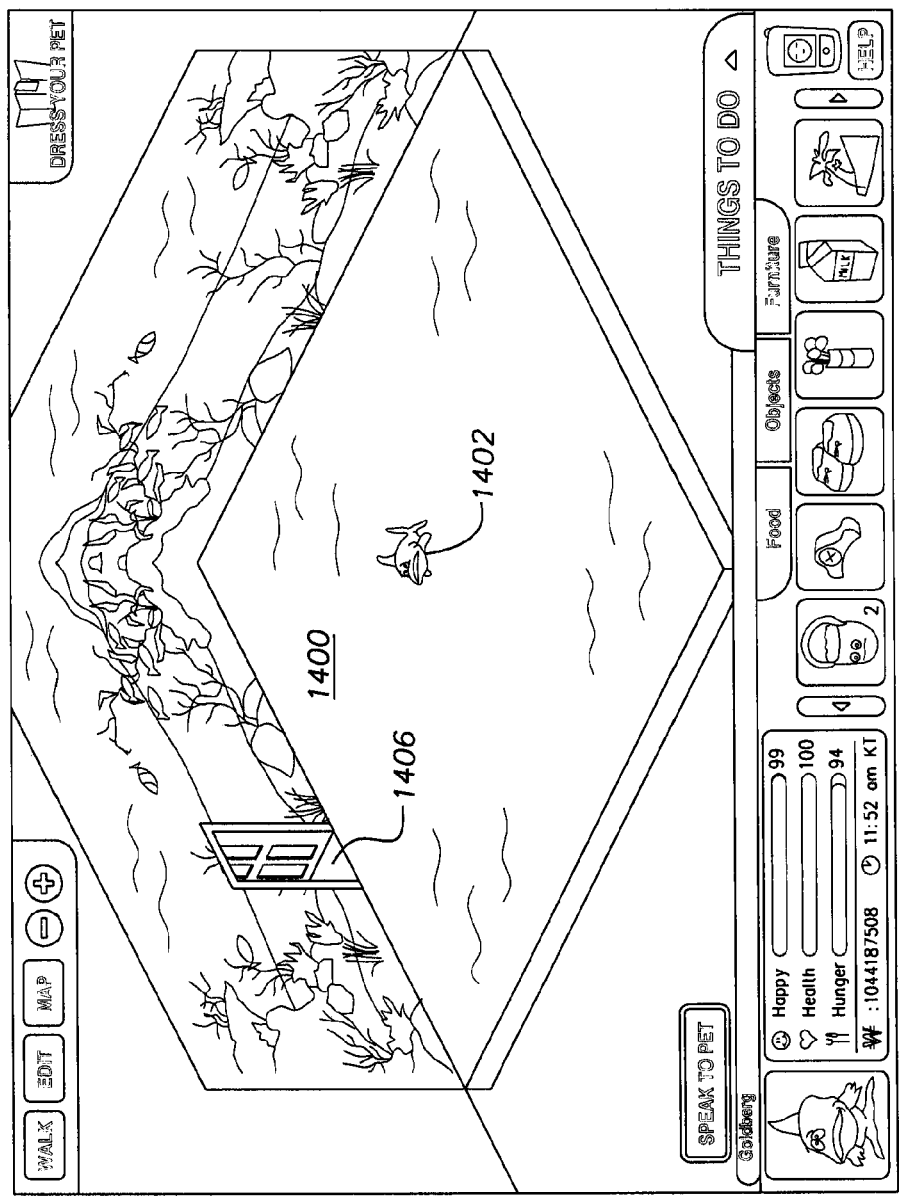
FIG. 5 shows a screen shot illustrating a virtual room representing a natural environment of a virtual character representing a toy fish, wherein the natural environment is an aquatic environment.

The example discussed above with reference to FIG. 12 is an example of the virtual character 802 transitioning from an airy, atmospheric environment to the liquid, aqueous environment. However, the reverse can also be accomplished by the System. For example, FIG. 5 shows a virtual character 1402 representing a fish toy in an aqueous virtual room 1400 in the virtual presentation. Since this virtual room 1400 represents the virtual character's natural environment no environment extension tool such as a life-sustaining measure is needed. Just as before, the virtual character 1402 can pass through doorway 1406 to enter the atmospheric virtual room 1500 shown in FIG. 14.

Figure 14:
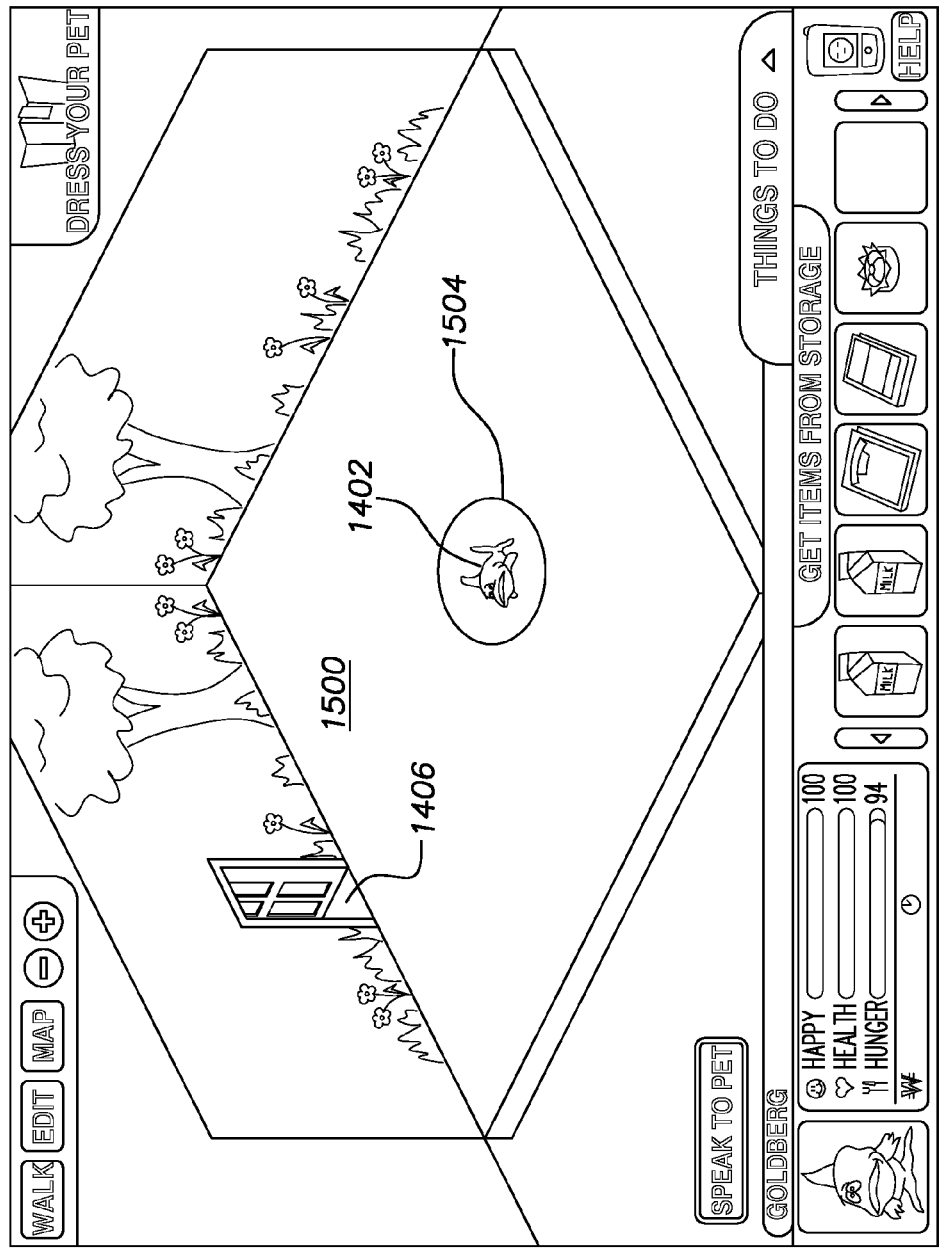
FIG. 14 shows a virtual character representing a toy fish provided with an environment extension tool, and more specifically a life-sustaining measure in the form of a water bubble while the virtual character is in an unnatural environment.

In FIG. 14 the virtual character 1402 is fully enveloped by a "water bubble". Thus, even though the virtual character 1402 is displayed within the virtual room 1500 representing an unnatural environment of the virtual character 1402, the natural environment of the virtual character 1402 has been "extended" into the unnatural environment. In other words, from the point of view of the virtual character 1402, the virtual character 1402 remains in its natural environment within the virtual room 1500 that represents the unnatural environment.

By providing virtual characters 802 and 1402 with the appropriate life-sustaining measure they can visit and interact with each other in any virtual room, regardless of whether the environment within that virtual room is the natural environment of both virtual characters 802 and 1402. Thus, as new toys become available for purchase, there is not a restriction requiring all toys to represent a real-world item having the same natural environment.

Although the examples above revolved around virtual characters that represented living creatures in the virtual presentation, other non-living creatures can likewise be provided with the environment extending tool to allow those virtual characters to enter and remain in virtual rooms representing unnatural environments. For example, virtual cars can be equipped with a floatation device. Further, any environment in addition to airy and aqueous environments are also contemplated. For example, a land based character such as a cat may be provided with an air bubble, space suit or other suitable life-sustaining measure that enables the virtual character to exist in an extraterrestrial environment.

The System can optionally display a plurality of virtual characters in the same virtual room, wherein none of, at least one of, or all of the virtual characters are in their natural environment, and none of, at least one of, or all of the virtual characters are in their unnatural environment.

Figure 15:
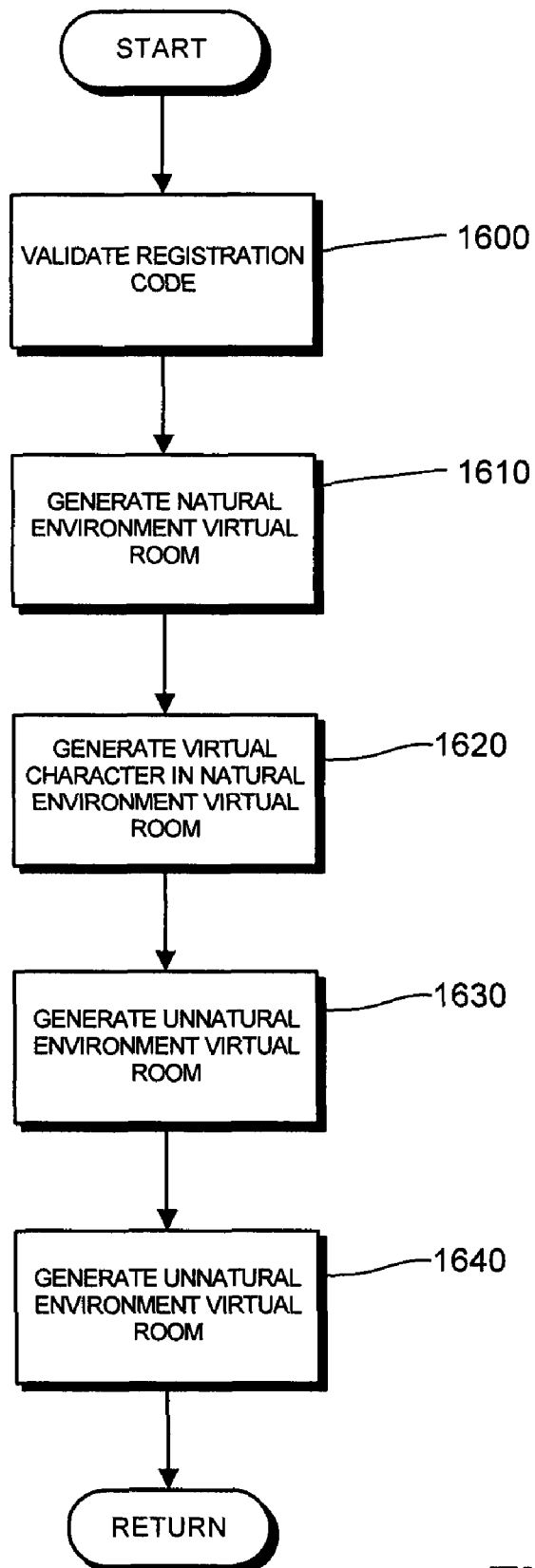
FIG. 15 shows a flow diagram illustrating a method of providing a virtual presentation including a virtual character in an unnatural environment in accordance with an embodiment of the invention.

An embodiment of a method according to the present invention is described next with reference to FIG. 15. A validation component of the System validates a registration code associated with a toy that represents a real-world item at step 1600. The type of real-world item, and more specifically the natural environment of that real-world item is included in the determination of the natural environment of the virtual character that is represented by a virtual MOM.

A natural environment component of the System, once the registration code has been validated, then generates at least one virtual room at step 1610. This virtual room generated by the natural environment component represents the natural environment of the real-world item represented by the toy in the virtual presentation, which, in turn, is the natural environment of the virtual character in the virtual presentation that represents the toy. A virtual character component generates the virtual character to represent the toy in the virtual room representing the natural environment of the real-world item at step 1620.

An unnatural environment component of the System, also subsequent to validation of the registration code, then generates at least one additional virtual room at step 1630. Unlike the virtual room generated at step 1610, this additional virtual room generated by the natural environment component represents the unnatural environment of the real-world item represented by the toy in the virtual presentation, which, in turn, is also the unnatural environment of the virtual character in the virtual presentation that represents the toy. When the virtual character enters the at least one additional virtual room representing the unnatural environment, a display generating component displays at step 1640 the virtual character provided with an "environment extension tool" in the virtual room representing the unnatural environment. As discussed elsewhere herein, the environment extension tool allows the virtual character to exist for an extended period of time in the virtual room representing the unnatural environment of the real-world item represented by the toy. The extended period of time can be any period of time that is of a greater duration than the real-world item could exist in the unnatural environment without the environment extension tool.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The invention has been described hereinabove using specific examples; however, it will be understood by those skilled in the art that various alternatives may be used and equivalents may be substituted for elements or steps described herein, without deviating from the scope of the invention. Modifications may be provided to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

The invention claimed is:

1. A method of providing a virtual presentation including a virtual item in an environment other than a natural environment of the virtual item, the method comprising:
   using a computer system, validating a registration code associated with a real-world item representing a living creature that breaths gaseous air for respiration as part of a registration process that associates the virtual item with a user as an interactive character to be controlled by the user in navigating the virtual presentation;
   storing, in a non-transitory computer memory provided to the computer system, the natural environment of the living creature and, based on said validating, providing at least one virtual room representing the natural environment of the living creature in the virtual presentation as determined, wherein the natural environment is a gaseous environment;
   transmitting content over a communication network to be used for displaying the virtual item in the virtual room representing the natural environment of the living creature with a user computer: wherein the virtual item represents the real-world item in the virtual presentation;
   storing, in the non-transitory computer memory provided to the computer system, at least one additional virtual room representing an unnatural environment of the living creature in the virtual presentation, wherein the unnatural environment of the living creature is different than the natural environment of the living creature and the at least one additional virtual room is made accessible to the virtual item only after validation of another registration code associated with a second real-world item that represents a second living creature that naturally exists in said unnatural environment of the living creature;
   establishing a relationship with the computer system between the virtual item and an environment extension tool that enables the virtual item to exist in the at least one additional virtual room representing the unnatural environment of the living creature, wherein the environment extension tool comprises a virtual air bubble representing gaseous air dissolved in the virtual presentation that envelops at least a portion of the virtual item while the virtual item is in the unnatural environment;
   transmitting content over the communication network to be used for displaying the virtual item provided with the environment extension tool in the virtual room representing the unnatural environment of the living creature, wherein an appearance of the virtual item in the virtual presentation changes to include the environment extension tool in response to movement of the virtual item from the virtual room representing the natural environment to the at least one additional virtual room representing the unnatural environment;
   transmitting content for making a second virtual room representing the unnatural environment available for purchase after the at least one additional room representing the unnatural environment is made accessible to the virtual item; and
   transmitting content over the communication network to be used for displaying a virtual schematic that includes an area of the virtual presentation comprising the virtual room representing the natural environment, the at least one virtual room representing the unnatural environment and the second virtual room representing the unnatural environment, if purchased.

2. The method according to claim 1 further comprising displaying another virtual item representing the second living creature that naturally exists in the unnatural environment of the living creature in the unnatural environment of the living creature along with the virtual item provided with the environment extension tool.

3. The method according to claim 1, wherein the virtual world is presented on a website that is accessible by the user computer from a remotely-located server.

4. The method according to claim 1 further comprising:
   providing one or more virtual furnishings for the virtual room representing the natural environment; and
   providing one or more virtual furnishings for the at least one additional virtual room representing the unnatural environment.

5. The method according to claim 1, wherein providing the at least one additional virtual room representing the unnatural environment occurs automatically, without additional user intervention upon validating the registration code associated with a subsequent item by the user, wherein a natural environment of the subsequent item is the unnatural environment of the living creature.

6. The method according to claim 2, wherein the virtual item interacts with the second virtual item while in the unnatural environment of the living creature.

7. The method according to claim 4, wherein the one or more virtual furnishings for the virtual room representing the natural environment are specific to the natural environment, and the one or more virtual furnishings for the another virtual room representing the unnatural environment are specific to the unnatural environment.

8. A method of providing a virtual presentation including a virtual character in an environment other than a natural environment of the virtual character, the method comprising:

using a computer system, validating a registration code associated with a toy, wherein a look of the toy represents a living creature that breathes gaseous oxygen for respiration;

storing, in a non-transitory computer memory provided to the computer system at least one virtual room comprising a gaseous environment in the virtual presentation representing a natural environment in which the living creature determined responsive to said validating said registration code can exist for an extended period of time without an artificial life-sustaining measure;

transmitting content over a communication network for displaying the virtual character representing the toy in the virtual room representing the natural environments;

storing, in the non-transitory computer memory, at least one additional virtual room in the virtual presentation representing an unnatural environment in which the living creature can not exist for an extended period of time without the artificial life-sustaining measure;

using the computer system, validating a registration code associated with a second toy, wherein a look of the second toy represents a second living creature, wherein the second living creature naturally exists in the unnatural environment of the living creature for the extended period of time without the artificial life-sustaining measure;

subsequent to validating the registration code associated with the second toy, making the at least one additional room representing the unnatural environment accessible to the virtual character;

transmitting content over the communication network for providing the virtual character with the artificial life-sustaining measure when the virtual character enters the virtual room representing the unnatural environment, the artificial life-sustaining measure enabling the virtual character to exist in the virtual room representing the unnatural environment for the extended period of time, wherein the artificial life-sustaining measure comprises a virtual air bubble displayed in the virtual presentation representing gaseous oxygen that envelops at least a portion of the virtual character while the virtual character is in the gaseous environment representing the unnatural environment of the living creature;

transmitting content over the communication network for displaying the virtual character and the life sustaining measure in the at least one additional virtual room representing the unnatural environment of the living creature;

transmitting content for making a second virtual room representing the unnatural environment available for purchase after the at least one additional room representing the unnatural environment is made accessible to the virtual character; and transmitting content over the communication network to be used for displaying a virtual schematic that includes an area of the virtual presentation comprising the virtual room representing the natural environment, the at least one virtual room representing the unnatural environment and the second virtual room representing the unnatural environment, if purchased.

9. The method according to claim 8 further comprising displaying another virtual character representing the second living creature that naturally exists in the unnatural environment of the living creature, wherein both the virtual character representing the living creature and the another virtual character representing the second living creature are displayed in the virtual room representing the unnatural environment of the living creature along with the artificial life-sustaining measure provided to the virtual character.

10. The method according to claim 8 further comprising:

providing one or more virtual furnishings for the virtual room representing the natural environment of the living creature; and providing one or more virtual furnishings for the at least one additional virtual room representing the unnatural environment of the living creature.

11. The method according to claim 8, wherein providing the at least one additional virtual room representing the unnatural environment of the living creature represented by the toy occurs automatically, without additional user intervention upon the validation of the registration code associated with the second toy representing the second living creature, wherein a natural environment of the second living creature is the unnatural environment of the living creature.

12. The method according to claim 9, wherein the virtual character interacts with the another virtual character while both the virtual character and the another virtual character are in the virtual room representing the unnatural environment of the living creature.

13. The method according to claim 10, wherein the one or more virtual furnishings for the virtual room representing the natural environment of the living creature are specific to that natural environment, and the one or more virtual furnishings for the at least one additional virtual room representing the unnatural environment of the living creature are specific to that unnatural environment.

14. A method of providing a virtual presentation including a virtual item in an environment other than a natural environment of the virtual item, the method comprising:

using a computer system, validating a registration code associated with a real-world item representing a living creature that breaths oxygen dissolved in a liquid for respiration as part of a registration process that associates the virtual item with a user as an interactive character to be controlled by the user in navigating the virtual presentation;

storing, in a non-transitory computer memory provided to the computer system, the natural environment of the living creature and, based on said validating, providing at least one virtual room representing the natural environment of the living creature in the virtual presentation as determined, wherein the natural environment is an aquatic environment;

transmitting content over a communication network to be used for displaying the virtual item in the virtual room representing the natural environment of the living creature with a user computer, wherein the virtual item represents the real-world item in the virtual presentation;

storing, in the non-transitory computer memory provided to the computer system, at least one additional virtual room representing an unnatural environment of the living creature in the virtual presentation, wherein the unnatural environment of the living creature is different than the natural environment of the living creature and the at least one additional virtual room is made accessible to the virtual item only after validation of another registration code associated with a second real-world item that represents a second living creature that naturally exists in said unnatural environment of the living creature;

establishing a relationship with the computer system between the virtual item and an environment extension tool that enables the virtual item to exist in the at least one additional virtual room representing the unnatural environment of the living creature, wherein the environment extension tool comprises a virtual water bubble representing oxygen dissolved in the liquid and is displayed in the virtual presentation enveloping at least a portion of the virtual item while the virtual item is in the unnatural environment;

transmitting content over the communication network to be used for displaying the virtual item provided with the environment extension tool in the virtual room representing the unnatural environment of the living creature, wherein an appearance of the virtual item in the virtual presentation changes to include the environment extension tool in response to movement of the virtual item from the virtual room representing the natural environment to the at least one additional virtual room representing the unnatural environment;

transmitting content for making a second virtual room representing the unnatural environment available for purchase after the at least one additional room representing the unnatural environment is made accessible to the virtual character; and transmitting content over the communication network to be used for displaying a virtual, schematic that includes an area of the virtual presentation comprising the virtual room representing the natural environment, the at least one virtual room representing the unnatural environment and the second virtual room representing the unnatural environment, if purchased.

15. A method of providing a virtual presentation including a virtual character in an environment other than a natural environment of the virtual character, the method comprising:

using a computer system, validating a registration code associated with a toy, wherein a look of the toy represents a living creature that breathes oxygen dissolved in a liquid for respiration;

storing, in a non-transitory computer memory provided to the computer system, at least one virtual room comprising an aquatic, environment in the virtual presentation representing a natural environment in which the living creature determined responsive to said validating said registration code can exist for an extended period of time without an artificial life-sustaining measure;

transmitting content over a communication network for displaying the virtual character representing the toy in the virtual room representing the natural environment;

storing, in the non-transitory computer memory, at least one additional virtual room in the virtual presentation representing an unnatural environment in which the living creature can not exist for an extended period of time without the artificial life-sustaining measure;

using the computer system, validating a registration code associated with a second toy, wherein a look of the second toy represents a second living creature, wherein the second living creature naturally exists in the unnatural environment of the living creature for the extended period of time without the artificial life-sustaining measure;

subsequent to validating the registration code associated with the second toy, making the at least one additional room representing the unnatural environment accessible to the virtual character;

transmitting content over the communication network for providing the virtual character with the artificial life-sustaining measure when the virtual character enters the virtual room representing the unnatural environment, the artificial life-sustaining measure enabling the virtual character to exist in the virtual room representing the unnatural environment for the extended period of time, wherein the artificial life-sustaining measure comprises a virtual water bubble displayed in the virtual presentation representing oxygen dissolved in the liquid that envelops at least a portion of the virtual character while the virtual character is in the virtual room representing the unnatural environment of the toy:

transmitting content over the communication network for displaying the virtual character and the life sustaining measure in the at least one additional virtual room representing the unnatural environment of the living creature;

transmitting content for making a second virtual room representing the unnatural environment available for purchase after the at least one additional room representing the unnatural environment is made accessible to the virtual character; and transmitting content over the communication network to be used for displaying a virtual schematic that includes an area of the virtual presentation comprising the virtual room representing the natural environment, the at least one virtual room representing the unnatural environment and the second virtual room representing the unnatural environment, if purchased.

* * * * *

UNITED STATES PATENT AND TRADEMARK OFFICE
CERTIFICATE OF CORRECTION

| | | |
|---|---|---|
| PATENT NO. | : 8,128,500 B1 | Page 1 of 1 |
| APPLICATION NO. | : 12/172625 | |
| DATED | : March 6, 2012 | |
| INVENTOR(S) | : Karl Joseph Borst et al. | |

It is certified that error appears in the above-identified patent and that said Letters Patent is hereby corrected as shown below:

Column 18, line 51 "character that is represented by a virtual MOM." should read
--character that is represented by a virtual room.--

Signed and Sealed this
Nineteenth Day of June, 2012

David J. Kappos
*Director of the United States Patent and Trademark Office*